United States Patent
Akkarakaran et al.

(10) Patent No.: US 8,929,475 B2
(45) Date of Patent: Jan. 6, 2015

(54) SYSTEM AND METHOD FOR UPLINK MULTIPLE INPUT MULTIPLE OUTPUT TRANSMISSION

(71) Applicant: QUALCOMM Incorporated, San Diego, CA (US)

(72) Inventors: Sony J. Akkarakaran, Poway, CA (US); Arjun Bharadwaj, San Diego, CA (US); Sharad Deepak Sambhwani, San Diego, CA (US); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/957,242

(22) Filed: Aug. 1, 2013

(65) Prior Publication Data
US 2014/0037019 A1 Feb. 6, 2014

Related U.S. Application Data

(60) Provisional application No. 61/679,544, filed on Aug. 3, 2012, provisional application No. 61/707,632, filed on Sep. 28, 2012, provisional application No. 61/711,054, filed on Oct. 8, 2012.

(51) Int. Cl.
*H04B 7/02* (2006.01)
*H04B 7/06* (2006.01)
*H04B 7/04* (2006.01)
*H04L 1/18* (2006.01)

(52) U.S. Cl.
CPC ............ *H04B 7/0613* (2013.01); *H04B 7/0413* (2013.01); *H04B 7/0404* (2013.01); *H04L 1/1819* (2013.01); *H04L 1/1822* (2013.01); *H04B 7/0617* (2013.01); *H04B 7/0619* (2013.01)

USPC ............. 375/267; 375/299; 455/450; 455/95; 455/102; 455/500

(58) Field of Classification Search
CPC .......... H04W 72/1268; H04W 52/286; H04W 52/16; H04W 72/14; H04W 72/1284; H04W 72/04; H04W 72/1278; H04W 52/325; H04W 72/0473; H04W 72/0413; H04W 88/02; H04W 72/02; H04W 52/42; H04W 84/042
USPC ............. 375/267, 299; 455/450, 95, 102, 500
See application file for complete search history.

(56) References Cited

U.S. PATENT DOCUMENTS

2011/0235586 A1 9/2011 Han et al.
2011/0243079 A1 10/2011 Chen et al.
(Continued)

FOREIGN PATENT DOCUMENTS

WO WO-2012093074 A1 7/2012

OTHER PUBLICATIONS

International Search Report—PCT/US2013/053465—ISAEPO—Mar. 20, 2014.

(Continued)

*Primary Examiner* — Rahel Guarino
(74) *Attorney, Agent, or Firm* — Charles Chesney

(57) ABSTRACT

Methods and apparatuses are provided for uplink MIMO transmissions in a wireless communication system. In some particular aspects, an E-TFC selection process for selecting a transport format combination for an uplink MIMO transmission may take certain steps in the case that a UE is power- or buffer-limited. For example, in a rank 2 transmission, non-scheduled data is allocated only to the primary stream. If the allocated non-scheduled data is less than the determined primary stream transport block size, scheduled data is allocated to the primary stream in an amount not to exceed the determined primary stream TBS. Finally, scheduled data is allocated to the secondary stream in an amount not to exceed the determined secondary stream TBS.

32 Claims, 10 Drawing Sheets

(56) References Cited

U.S. PATENT DOCUMENTS

| | | |
|---|---|---|
| 2011/0263281 A1 | 10/2011 | Cai et al. |
| 2011/0310986 A1 | 12/2011 | Heo et al. |
| 2012/0177089 A1* | 7/2012 | Pelletier et al. .............. 375/219 |
| 2012/0188960 A1 | 7/2012 | Hultell et al. |
| 2012/0275403 A1 | 11/2012 | Zhang et al. |
| 2012/0281642 A1 | 11/2012 | Sambhwani et al. |
| 2014/0036967 A1 | 2/2014 | Akkarakaran et al. |

OTHER PUBLICATIONS

QUALCOMM Incorporated: "Signaling grants for the secondary E-DPDCH and E-TFCI selection for UL MIMO", 3GPP Draft; R1-121781 ULMIMO GrantsetFCselection, 3rd Generation Partnership Project (3GPP), Mobile Competence Centre, 650, Route Deslucioles, F-06921 Sophia-Anti Polis Cedex, France, vol. RAN WG1, No. Jeju, Korea; 20120326-20120330, Mar. 20, 2012, XP050600031, pp. 1-3.

3GPP TS 25.423: "3rd Generation Partnership Project; Technical Specification Group Radio Access Network; UTRAN Iur interface RNSAP signalling", V7.4.0, Release 7, Mar. 2007, pp. 787.

Hauwei, Hisilicon: "E-TFC selection for UL MIMO," Discussion and Decision, R2-124799,3GPP TSG-RAN2 Meeting #79bis, Bratislava, Slovakia, Oct. 08-12, 2012, 3 Pages.

Interdigital Communications, LLC: "E-TFC selection for HSUPA MIMO," Discussion, R2-123907,3GPP TSG-RAN WG2 Meeting #79, Qingdao, China, Aug. 13-17, 2012, 8 Pages.

Nokia Siemens Networks, "MIMO with 64QAM for HSUPA," 3GPP TSG RAN Meeting #54 Berlin, Germany, Dec. 6-9, 2011, RP-111642, 6 pages.

QUALCOMM Incorporated, "Summary of e-mail discussion on E-TFC Selection for UL MIMO," 3GPP TSG RAN WG1 Meeting #70 Qingdao, China, Aug. 13-17, 2012, R1-123803, 4 pages.

TSG RAN WG1: "LS on RAN1 agreements on MIMO with 64QAM for HSUPA," R1-122916,3GPP TSG RAN WG1 Meeting #69, Release 11, Prague, Czech Republic, May 21-25, 2012, 8 Pages.

* cited by examiner

SYSTEM AND METHOD FOR UPLINK MULTIPLE INPUT MULTIPLE OUTPUT TRANSMISSION

CROSS-REFERENCE TO RELATED APPLICATIONS

This application claims priority to and the benefit of provisional patent application No. 61/679,544, titled, "Remaining Aspects of E-TFC Selection for UL MIMO," filed in the United States Patent and Trademark office on Aug. 3, 2012; provisional patent application No. 61/707,632, titled, "Handling of Non-Scheduled Grants During Rank 2 UL MIMO Transmission," filed in the United States Patent and Trademark office on Sep. 28, 2012; and provisional patent application No. 61/711,054, titled, "Handling of Non-Scheduled Grants During Rank 2 UL MIMO Transmission," filed in the United States Patent and Trademark office on Oct. 8, 2012, the entire contents of which are incorporated herein by reference.

BACKGROUND

1. Field

Aspects of the present disclosure relate generally to wireless communication systems, and more particularly, to configuration of uplink multiple-input multiple-output (MIMO) transmissions.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

For example, recent releases of 3GPP standards for UMTS technologies have included multiple input multiple output (MIMO) for downlink transmissions. MIMO can enable increased throughput in a transmission without requiring a commensurate increase in spectrum use, since two streams can be transmitted in the same carrier frequency, where they are separated by the spatial dimension by being transmitted from spatially separate antennas. In this way, an effective doubling of spectral efficiency can be achieved by transmitting dual transport blocks per transmission time interval.

Further, recent attention within the 3GPP standards body has been directed to a particular uplink beamforming transmit diversity (BFTD) scheme for high speed packet access (HSPA) networks within the UMTS standards, where a mobile terminal utilizes two transmit antennas and two power amplifiers for uplink transmissions. This scheme, when implemented in a closed loop mode under network control, has shown significant improvement in cell edge user experience, as well as overall improvements in system performance. However, in schemes that have been investigated, the mobile terminal has been limited to single stream transmissions across the two antennas.

Therefore, to increase the throughput and spectral efficiency for uplink transmissions, there is a desire to implement MIMO for uplink transmissions such that dual transport blocks can be transmitted in the same carrier frequency during the same transmission time interval.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for uplink MIMO transmissions in a wireless communication system. In some particular aspects, an E-TFC selection process for selecting a transport format combination for an uplink MIMO transmission may take certain steps in the case that a UE is power- or buffer-limited. For example, in a rank 2 transmission, non-scheduled data is allocated only to the primary stream. If the allocated non-scheduled data is less than the determined primary stream transport block size, scheduled data is allocated to the primary stream in an amount not to exceed the determined primary stream TBS. Finally, scheduled data is allocated to the secondary stream in an amount not to exceed the determined secondary stream TBS.

For example, in one aspect, the disclosure provides a method of configuring an uplink multiple-input multiple-output (MIMO) transmission at a wireless user equipment (UE), including receiving an absolute grant for the uplink MIMO transmission, comprising a first grant for scheduled data and at least one second grant for non-scheduled data, determining a primary stream transport block size (TBS) and a secondary stream TBS, determining a power level for both the primary stream and a secondary stream, and, if an E-TFC selection process for the UE is power- or buffer-limited, allocating the non-scheduled data only to the primary stream. Further, if the allocated non-scheduled data is less than the determined primary stream TBS, the method includes allocating the scheduled data to the primary stream in an amount not to exceed the determined primary stream TBS, and allocating the scheduled data to the secondary stream in an amount not to exceed the determined secondary stream TBS.

Another aspect of the disclosure provides a wireless UE configured for uplink MIMO transmission, including means for receiving an absolute grant for the uplink MIMO transmission, including a first grant for scheduled data and at least one second grant for non-scheduled data, means for determining a primary stream transport block size (TBS) and a secondary stream TBS, means for determining a power level for both the primary stream and a secondary stream, and means for, if an E-TFC selection process for the UE is poweror buffer-limited, allocating the non-scheduled data only to the primary stream, if the allocated non-scheduled data is less than the determined primary stream TBS, allocating the scheduled data to the primary stream in an amount not to exceed the determined primary stream TBS, and allocating the scheduled data to the secondary stream in an amount not to exceed the determined secondary stream TBS.

Another aspect of the disclosure provides a wireless UE configured for uplink MIMO transmission, including at least one processor, a memory coupled to the at least one processor, and a wireless communication interface coupled to the at least one processor. Here, the at least one processor is configured to receive an absolute grant for the uplink MIMO transmission, comprising a first grant for scheduled data and at least one second grant for non-scheduled data, to determine a primary stream transport block size (TBS) and a secondary stream TBS, to determine a power level for both the primary stream and a secondary stream, and, if an E-TFC selection process for the UE is power- or buffer-limited, to allocate the non-scheduled data only to the primary stream, if the allocated non-scheduled data is less than the determined primary stream TBS, to allocate the scheduled data to the primary stream in an amount not to exceed the determined primary stream TBS, and to allocate the scheduled data to the secondary stream in an amount not to exceed the determined secondary stream TBS.

Another aspect of the disclosure provides a non-transitory computer-readable medium operable at a wireless user equipment configured for uplink MIMO transmission, including instructions for causing a computer to receive an absolute grant for the uplink MIMO transmission, comprising a first grant for scheduled data and at least one second grant for non-scheduled data, instructions for causing a computer to determine a primary stream transport block size (TBS) and a secondary stream TBS, instructions for causing a computer to determine a power level for both the primary stream and a secondary stream, and instructions for causing a computer to, if an E-TFC selection process for the UE is power- or buffer-limited, allocate the non-scheduled data only to the primary stream, if the allocated non-scheduled data is less than the determined primary stream TBS, allocate the scheduled data to the primary stream in an amount not to exceed the determined primary stream TBS, and to allocate the scheduled data to the secondary stream in an amount not to exceed the determined secondary stream TBS.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
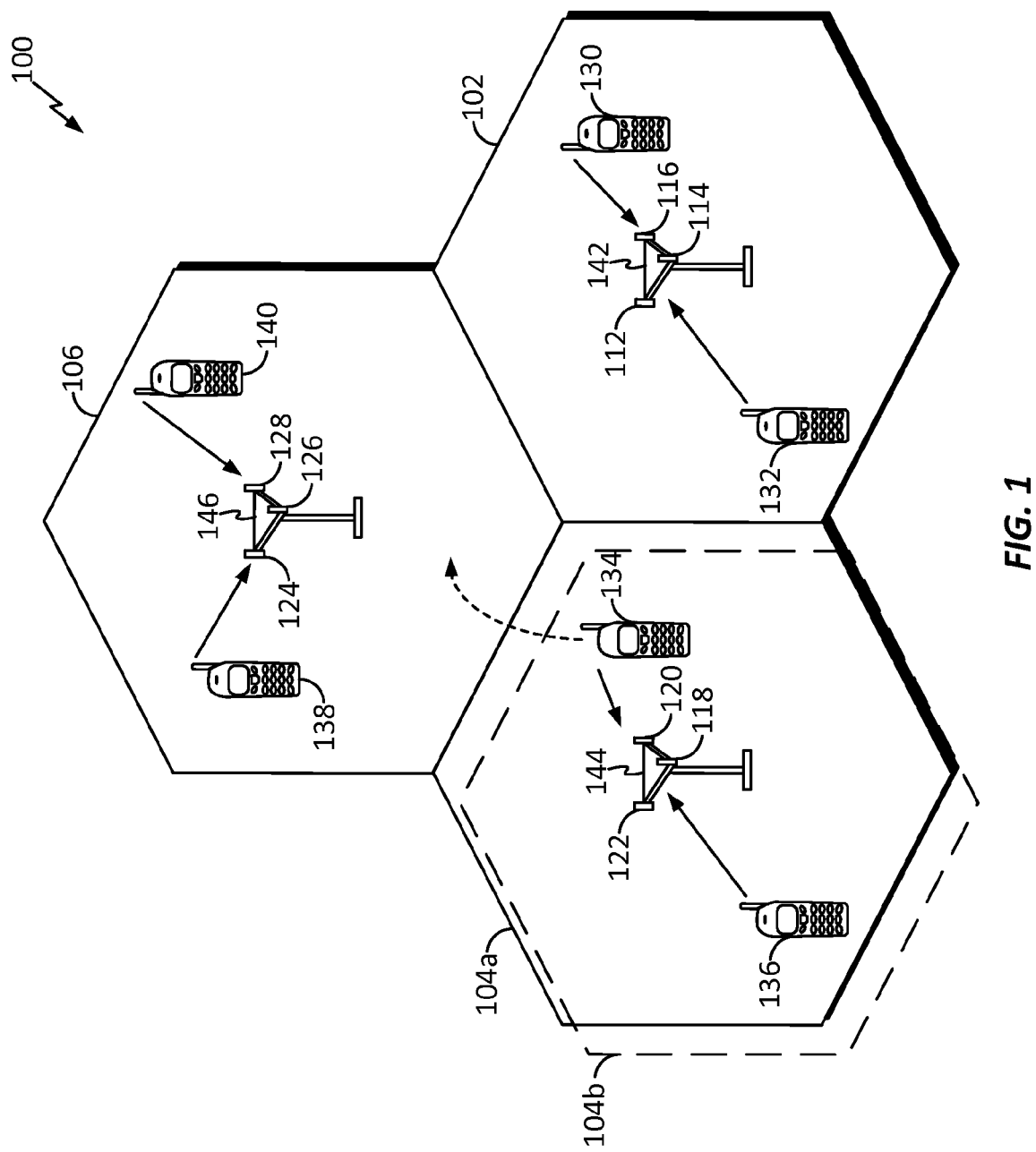
FIG. 1 is a conceptual diagram illustrating an example of an access network.

The various concepts presented throughout this disclosure may be implemented across a broad variety of telecommunication systems, network architectures, and communication standards. Referring to FIG. 1, by way of example and without limitation, a simplified access network 100 in a UMTS Terrestrial Radio Access Network (UTRAN) architecture, which may utilize High-Speed Packet Access (HSPA), is illustrated. The system includes multiple cellular regions (cells), including cells 102, 104, and 106, each of which may include one or more sectors. Cells may be defined geographically, e.g., by coverage area, and/or may be defined in accordance with a frequency, scrambling code, etc. That is, the illustrated geographically-defined cells 102, 104, and 106 may each be further divided into a plurality of cells, e.g., by utilizing different frequencies or scrambling codes. For example, cell 104a may utilize a first frequency or scrambling code, and cell 104b, while in the same geographic region and served by the same Node B 144, may be distinguished by utilizing a second frequency or scrambling code.

In a cell that is divided into sectors, the multiple sectors within a cell can be formed by groups of antennas with each antenna responsible for communication with UEs in a portion of the cell. For example, in cell 102, antenna groups 112, 114, and 116 may each correspond to a different sector. In cell 104, antenna groups 118, 120, and 122 each correspond to a different sector. In cell 106, antenna groups 124, 126, and 128 each correspond to a different sector.

The cells 102, 104 and 106 may include several UEs that may be in communication with one or more sectors of each cell 102, 104 or 106. For example, UEs 130 and 132 may be in communication with Node B 142, UEs 134 and 136 may be in communication with Node B 144, and UEs 138 and 140 may be in communication with Node B 146. Here, each Node B 142, 144, 146 is configured to provide an access point to a core network 204 (see FIG. 2) for all the UEs 130, 132, 134, 136, 138, 140 in the respective cells 102, 104, and 106.

Figure 2:
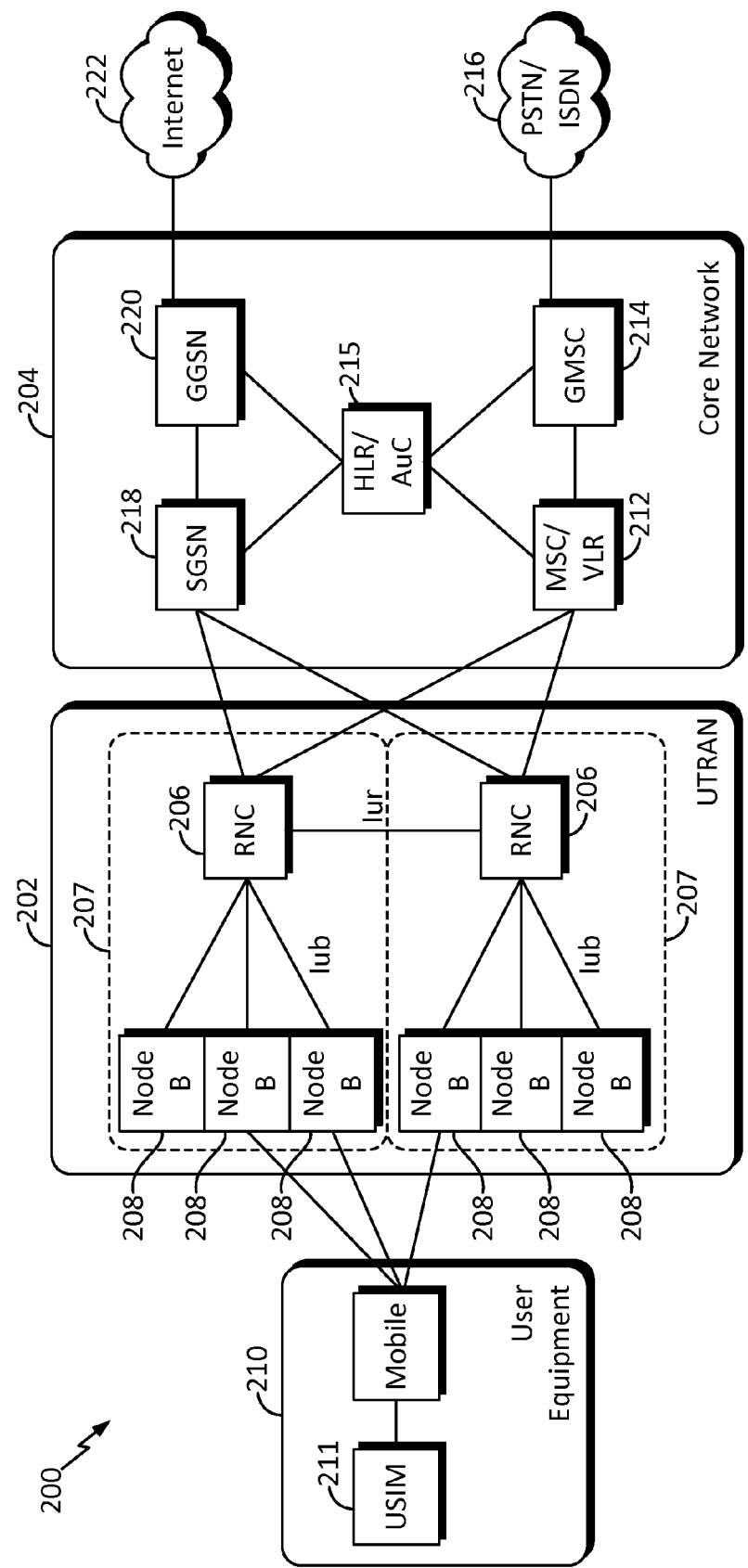
FIG. 2 is a block diagram conceptually illustrating an example of a telecommunications system.

Referring now to FIG. 2, by way of example and without limitation, various aspects of the present disclosure are illustrated with reference to a Universal Mobile Telecommunications System (UMTS) system 200 employing a wideband code division multiple access (W-CDMA) air interface. A UMTS network includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as the illustrated RNSs 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

Figure 3:
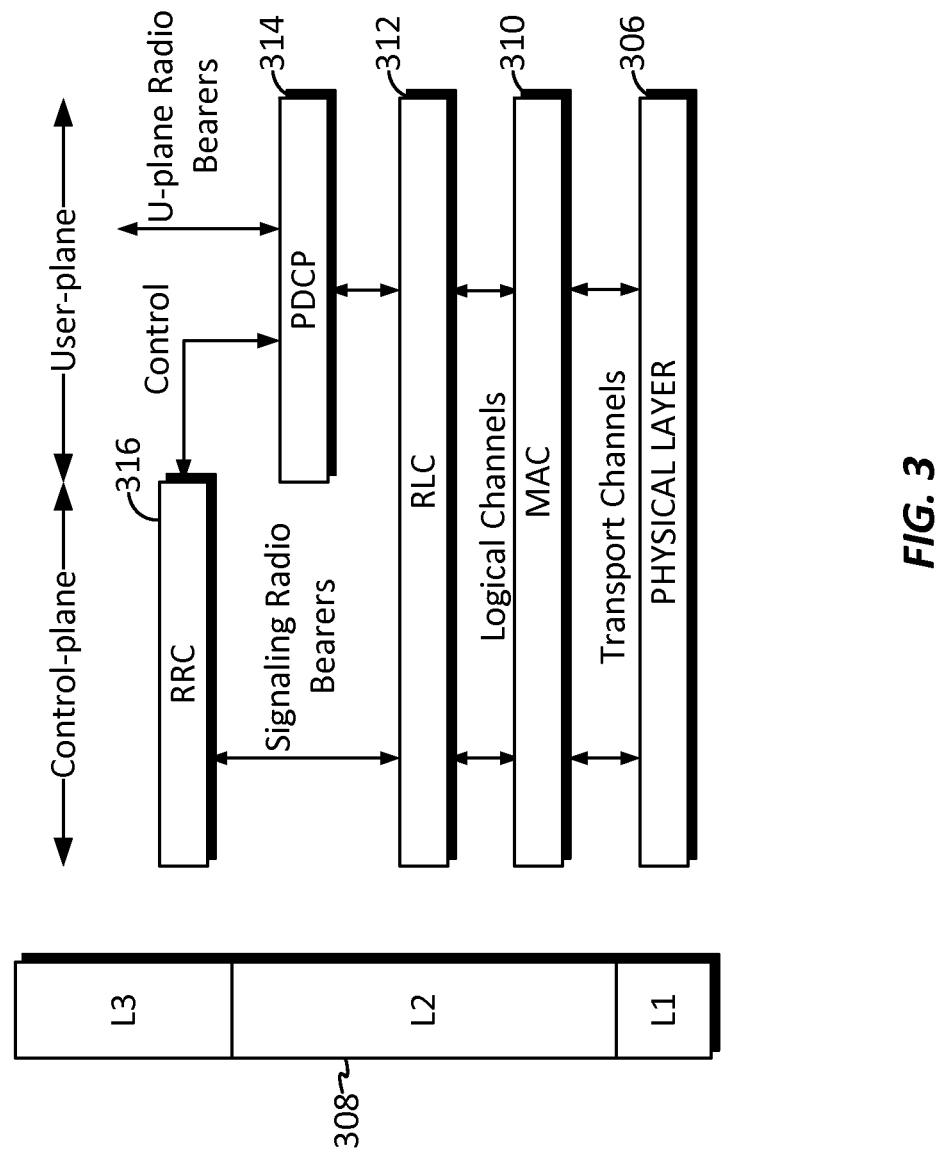
FIG. 3 is a conceptual diagram illustrating an example of a radio protocol architecture for the user and control plane.

In a wireless telecommunication system, the radio protocol architecture between a mobile device and a cellular network may take on various forms depending on the particular application. An example for a 3GPP high-speed packet access (HSPA) system will now be presented with reference to FIG. 3, illustrating an example of the radio protocol architecture for the user and control planes between the UE 210 and the Node B 208. Here, the user plane or data plane carries user traffic, while the control plane carries control information, i.e., signaling.

Turning to FIG. 3, the radio protocol architecture for the UE 210 and Node B 208 is shown with three layers: Layer 1, Layer 2, and Layer 3. Although not shown, the UE 210 may have several upper layers above the L3 layer including a network layer (e.g., IP layer) that is terminated at a PDN gateway on the network side, and an application layer that is terminated at the other end of the connection (e.g., far end UE, server, etc.).

At Layer 3, the RRC layer 316 handles control plane signaling between the UE 210 and the Node B 208. RRC layer 316 includes a number of functional entities for routing higher layer messages, handling broadcast and paging functions, establishing and configuring radio bearers, etc.

The data link layer, called Layer 2 (L2 layer) 308 is between Layer 3 and the physical layer 306, and is responsible for the link between the UE 210 and Node B 208. In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Of course, those of ordinary skill in the art will comprehend that additional or different sublayers may be utilized in a particular implementation of the L2 layer 308, still within the scope of the present disclosure.

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 provides segmentation and reassembly of upper layer data packets, retransmission of lost data packets, and reordering of data packets to compensate for out-of-order reception due to a hybrid automatic repeat request (HARQ).

The MAC sublayer 310 provides multiplexing between logical channels and transport channels. The MAC sublayer 310 is also responsible for allocating the various radio resources (e.g., resource blocks) in one cell among the UEs. The MAC sublayer 310 is also responsible for HARQ operations.

Layer 1 is the lowest layer and implements various physical layer signal processing functions. Layer 1 will be referred to herein as the physical layer (PHY) 306. At the PHY layer 306, the transport channels are mapped to different physical channels.

Data generated at higher layers, all the way down to the MAC layer 310, are carried over the air through transport channels. 3GPP Release 5 specifications introduced downlink enhancements referred to as HSDPA. HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries HARQ ACK/NACK signaling on the uplink to indicate whether a corresponding packet transmission was decoded successfully. That is, with respect to the downlink, the UE 210 provides feedback to the Node B 208 over the HS-DPCCH to indicate whether it correctly decoded a packet on the downlink.

HS-DPCCH further includes feedback signaling from the UE 210 to assist the Node B 208 in taking the right decision in terms of modulation and coding scheme and precoding weight selection, this feedback signaling including the channel quality indicator (CQI) and precoding control information (PCI).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel) or a pilot channel (e.g., a primary pilot channel) in accordance with whether reference is being made to the channel's control aspects or its pilot aspects.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH). Further, in accordance with aspects of the present disclosure, for HSUPA with MIMO utilizing two transmit antennas, the physical channels may include one or more of a Secondary E-DPDCH (S-E-DPDCH), a Secondary E-DPCCH (S-E-DPCCH), a Secondary DPCCH (S-DPCCH), and/or an EUL Rank and Offset Channel (E-ROCH). Additional information about these channels is provided below.

That is, part of the ongoing development of HSPA standards (including HSDPA and EUL) includes the addition of multiple-input, multiple-output (MIMO) communication. MIMO generally refers to the use of multiple antennas at the transmitter (multiple inputs to the channel) and the receiver (multiple outputs from the channel) to implement spatial multiplexing, that is, the transmission and/or reception of different streams of information from spatially separated antennas, utilizing the same carrier frequency for each stream. Such a scheme can increase throughput, that is, can achieve higher data rates without necessarily expanding the channel bandwidth, thus improving spectral efficiency. That is, in an aspect of the disclosure, the Node B 208 and/or the UE 210 may have multiple antennas supporting MIMO technology.

MIMO for increased downlink performance was implemented in Release 7 of the 3GPP UMTS standards for HSDPA, and Release 9 included DC-HSDPA+MIMO for further increased downlink performance. In HSDPA MIMO the Node B 208 and the UE 210 each utilize two antennas, and a closed loop feedback from the UE 210 (Precoding Control Information, PCI) is utilized to dynamically adjust the Node B's transmit antenna weighting. When channel conditions are favorable, MIMO can allow a doubling of the data rate by transmitting two data streams, utilizing spatial multiplexing. When channel conditions are less favorable, a single stream transmission over the two antennas can be utilized, providing some benefit from transmit diversity.

While MIMO in the uplink would be desirable for essentially the same reasons it has been implemented for the downlink, it has been considered somewhat more challenging, in part because the battery power-constrained UE may need to include two power amplifiers. Nonetheless, more recently an uplink beamforming transmit diversity (BFTD) scheme for HSPA that utilizes 2 transmit antennas and 2 power amplifiers at the UE 210 has garnered substantial interest, and studies have been directed to both open loop and closed loop modes of operation. These studies have shown improvements in cell edge user experience and overall system performance. However, these uplink transmit diversity schemes have generally been limited to single code word or single transport block transmissions utilizing dual transmit antennas.

Thus, various aspects of the present disclosure provide for uplink MIMO transmissions. For clarity by providing explicit details, the present description utilizes HSUPA terminology and generally assumes a 3GPP implementation in accordance with UMTS standards. However, those of ordinary skill in the art will understand that many if not all these features are not specific to a particular standard or technology, and may be implemented in any suitable technology for MIMO transmissions.

In an HSUPA system, data transmitted on a transport channel such as the E-DCH is generally organized into transport blocks. During each transmission time interval (TTI), without the benefits of spatial multiplexing, at most one transport block of a certain size (the transport block size or TBS) can be transmitted per carrier on the uplink from the UE 210. However, with MIMO using spatial multiplexing, multiple transport blocks can be transmitted per TTI in the same carrier, where each transport block corresponds to one code word.

Figure 4:
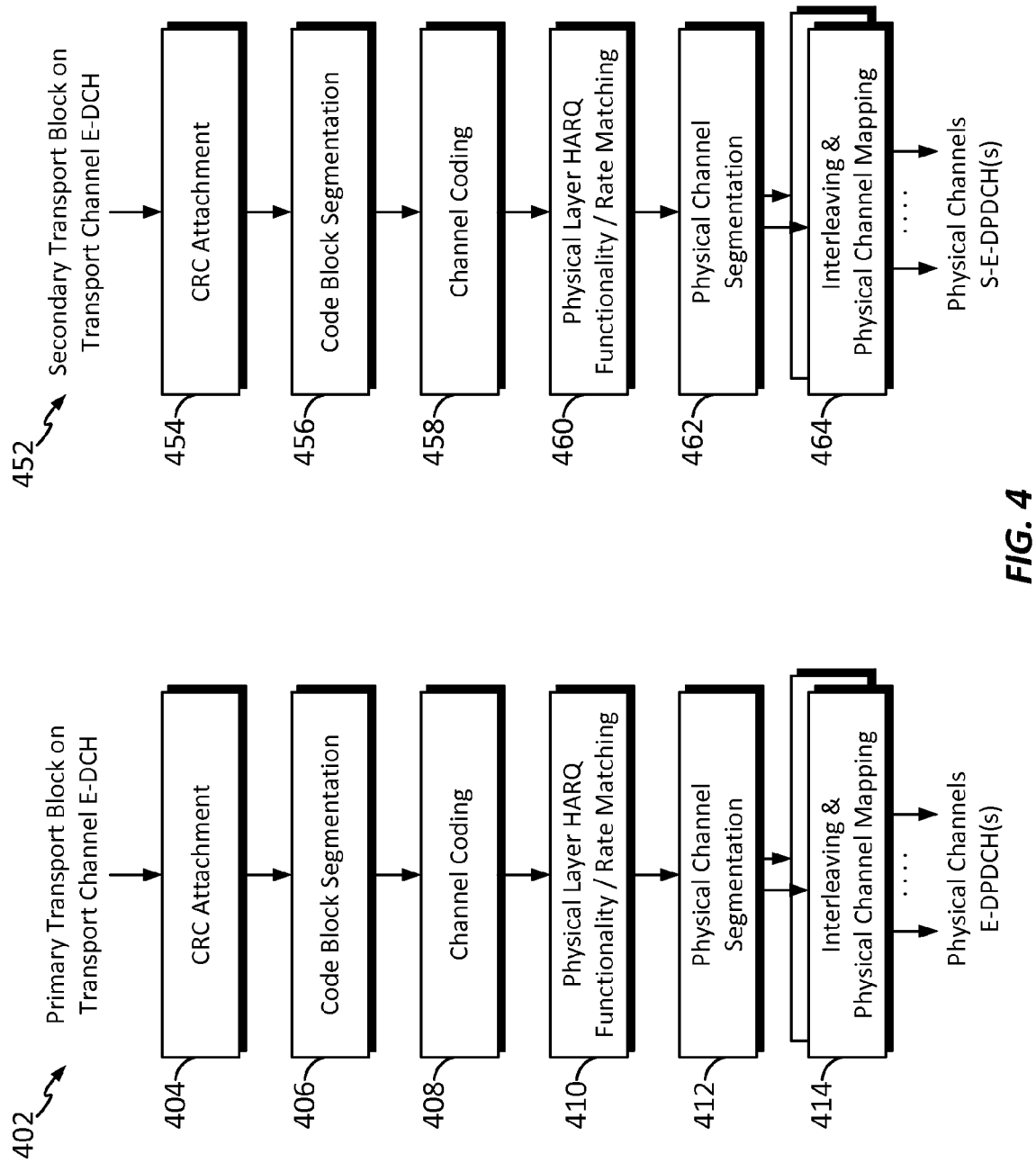
FIG. 4 is a block diagram illustrating a portion of a MAC layer implementing dual HARQ processes in accordance with one example of an uplink MIMO transmission.

As illustrated in FIG. 4, in an aspect of the present disclosure illustrating some of the operations at the MAC layer 310, the transmission of dual transport blocks on the two precoding vectors may be implemented across dual HARQ processes during the same TTI. In various examples, each of the blocks illustrated in FIG. 4 may be implemented as software modules, which may be stored in a memory and executed by a processor at the UE 210; hardware circuitry such as may be implemented in an application-specific integrated circuit or DSP; or a combination thereof.

Here, the dual transport blocks are provided to the physical layer 306 on one E-DCH transport channel. In each HARQ process, when a transport block on the E-DCH is received from higher layers, the process for mapping that transport block to the physical channels E-DPDCH (or, when utilizing the secondary transport block, the S-E-DPDCH) may include several operations such as CRC attachment 404, 454; code block segmentation 406, 456; channel coding 408, 458; rate matching 410, 460; physical channel segmentation 412, 462; and interleaving/physical channel mapping 414, 464. Details of these blocks are largely known to those of ordinary skill in the art, and are therefore omitted from the present disclosure.

FIG. 4 illustrates this process for the generation of an UL MIMO transmission using dual transport blocks 402, 452. This scheme is frequently referred to as a multiple code word scheme, since each of the transmitted streams may be precoded utilizing separate codewords. In some aspects of the disclosure, the E-DCH processing structure is essentially identical for each of the two transport blocks. Additionally, this scheme is frequently referred to as a dual stream scheme, where the primary transport bock is provided on the primary stream, and the secondary transport block is provided on the secondary stream. In some examples, such a dual stream scheme may be referred to as a rank 2 scheme. That is, the rank of an UL MIMO transmission may, for example, be of rank 1 or rank 2. Here, a rank 1 transmission utilizes one precoding vector, and transmits the stream on the E-DPDCH. A rank 2 transmission utilizes two precoding vectors, applied to two streams, respectively, transmitted on the E-DPDCH and the secondary S-E-DPDCH. Here, in an aspect of the present disclosure, the first stream and the secondary stream may be spatially separated streams of an uplink MIMO transmission, which share the same carrier frequency.

Figure 5:
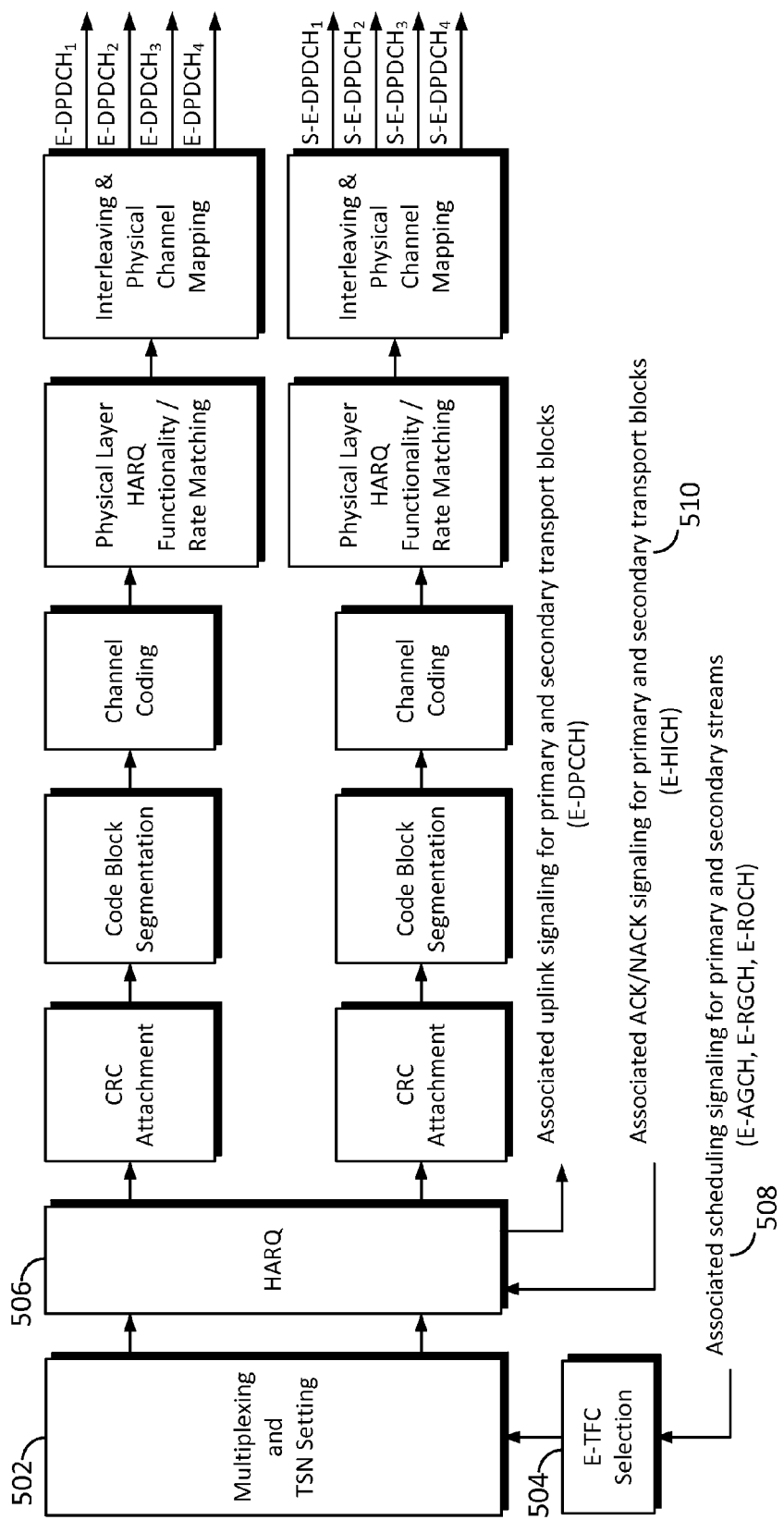
FIG. 5 is a block diagram illustrating additional portions of the MAC layer illustrated in FIG. 4 according to one example.

FIG. 5 provides another example in accordance with the present disclosure, including circuitry or functionality additional to that illustrated in FIG. 4, showing operation of a Multiplexing and Transmission Sequence Number (TSN) setting entity 502, an E-DCH Transport Format Combination (E-TFC) selection entity 504, and a Hybrid Automatic Repeat Request (HARQ) entity 506 within a UE such as the UE 210. In various examples, each of the blocks illustrated in FIG. 5 may be implemented as software modules, which may be stored in a memory and executed by a processor at the UE 210; hardware circuitry such as may be implemented in an application-specific integrated circuit or DSP; or a combination thereof.

Figure 9:
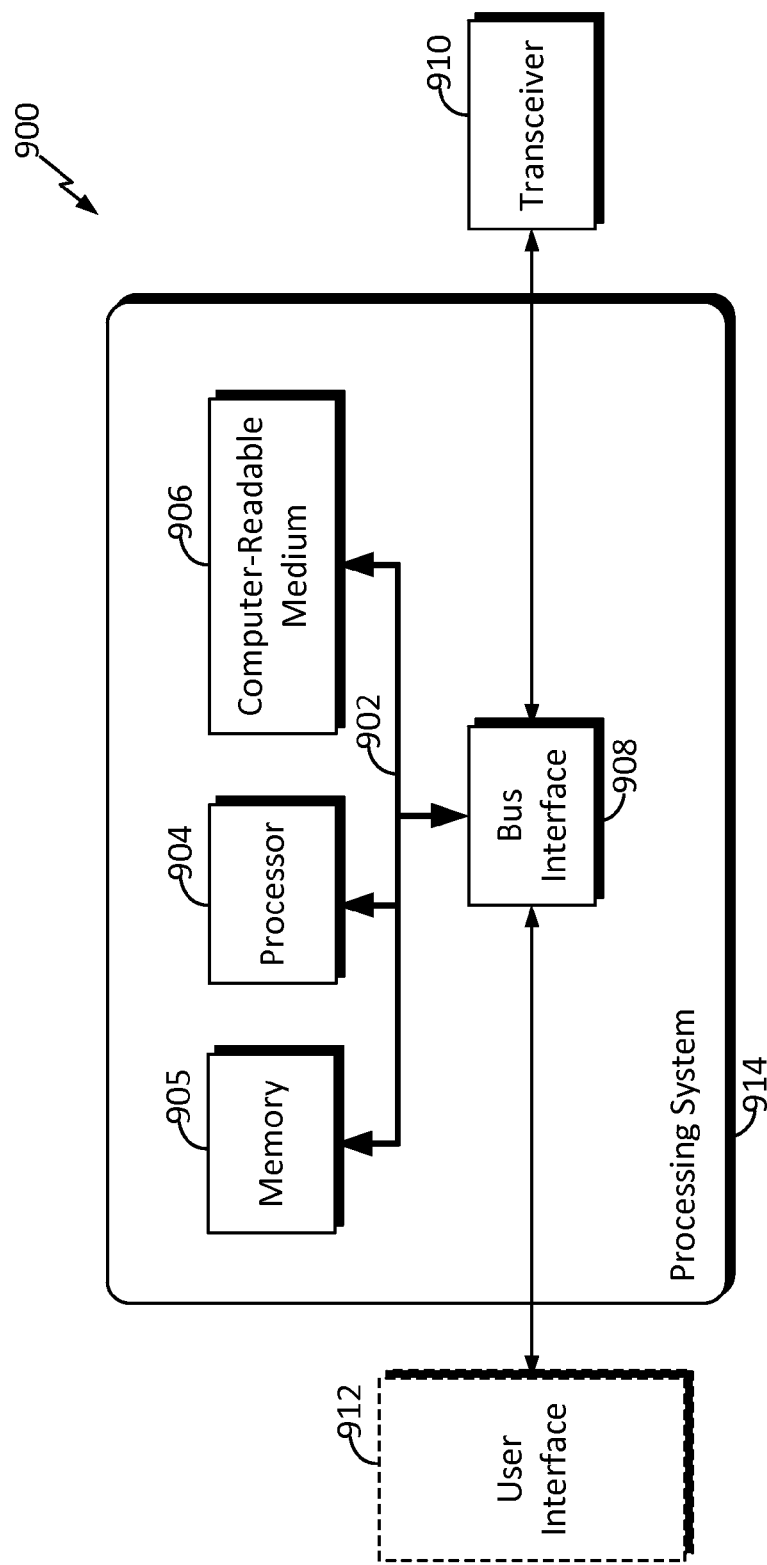
FIG. 9 is an example of a hardware implementation for an apparatus employing a processing system.

Each of the E-TFC selection entity 504, the multiplexing and TSN setting entity 502, and the HARQ entity 506 may include a processing system 914 as illustrated in FIG. 9, described below, for performing processing functions such as making determinations relating to the E-DCH transport format combination, handling MAC protocol data units, and performing HARQ functions, respectively. Of course, some or all of the respective entities may be combined into a single processor or processing system 914. Here, the processing system 914 may control aspects of the transmission of the primary and secondary streams as described below.

In some aspects of the disclosure, according at least in part to information 508 received on the E-AGCH, the E-RGCH, and/or the E-ROCH, the E-TFC selection entity 504 may determine the rank for an uplink transmission, the transport block size(s) (TBS), and the power levels to utilize on the uplink stream(s). For example, the E-TFC selection entity 504 may determine whether to transmit a single transport block (e.g., a Rank 1 transmission utilizing uplink beamforming transmit diversity), or dual transport blocks (e.g., a Rank 2 transmission utilizing spatial multiplexing). In this example, the multiplexing and TSN setting entity 502 may concatenate multiple MAC-d Protocol Data Units (PDUs) or segments of MAC-d PDUs into MAC-is PDUs, and may further multiplex one or more MAC-is PDUs into a single MAC-i PDU to be transmitted in the following TTI, as instructed by the E-TFC selection entity 504. The MAC-i PDU may correspond to the transport block provided on a corresponding stream. That is, if the E-TFC selection entity 504 determines to transmit two transport blocks, then two MAC-i PDUs may be generated by the Multiplexing and TSN Setting entity 502 and delivered to the HARQ entity 506.

Physical Channels

Returning again to FIG. 4, the physical channels may be combined with suitable channelization codes, weighted with suitable gain factors, mapped to a suitable I or Q branch, and grouped by summing blocks into virtual antennas. In various aspects of the present disclosure, the primary virtual antenna may be referred to as a primary stream, and the secondary virtual antenna may be referred to as a secondary stream. Here, the streams are fed into a virtual antenna mapping entity configured to map the first stream and the second stream to spatially separated physical antennas, utilizing a configuration that may be adapted for power balancing between the respective physical antennas.

One or more precoding vectors may be expressed utilizing precoding weights, e.g., $w_1$, $w_2$, $w_3$, and $w_4$. Here, the spread complex valued signals from the virtual antennas may be weighted utilizing a primary precoding vector $[w_1, w_2]$ and a secondary precoding vector $[w_3, w_4]$, respectively. Here, if the UE 210 is configured to transmit a single transport block in a particular TTI, it may utilize the primary precoding vector $[w_1, w_2]$ for weighting the signal; and if the UE 210 is configured to transmit dual transport blocks in a particular TTI, the UE may utilize the primary precoding vector $[w_1, w_2]$ for virtual antenna 1, and the secondary precoding vector $[w_3, w_4]$ for virtual antenna 2. In this way, when the UE 210 transmits a single stream only, it may easily fall back to closed loop beamforming transmit diversity, which may be based on maximum ratio transmission, wherein the single stream is transmitted on the strong eigenmode or singular value. On the other hand, the UE 210 may easily utilize both precoding vectors for MIMO transmissions. That is, the primary stream including the E-DPDCH(s) may be precoded utilizing the primary precoding vector $[w_1, w_2]$ while the secondary stream including the S-E-DPDCH(s) may be precoded utilizing the secondary precoding vector $[w_3, w_4]$.

E-TFC Selection Procedure

One or more aspects of the present disclosure relate broadly to an E-TFC selection procedure implemented at a UE 210 (e.g., at an E-TFC selection entity 504), for selecting a transport format combination to utilize for each stream in an uplink transmission during a particular TTI. That is, when the UE 210 connects to the network, a set of reference E-TFCs are signaled to the UE. Broadly, in an E-TFC selection procedure, the UE selects one of these available E-TFCs for an uplink transmission. For example, an E-TFC selection procedure may rely on three input parameters for each transport block: the power available to the UE for transmission, a scheduling grant received from the network, and an amount of data in a buffer that is ready for transmission. Thus, for a dual-stream uplink MIMO transmission, in a sense the E-TFC selection procedure utilizes six input parameters (although in some examples a single data buffer may be shared for both streams).

Based on these input parameters, at each TTI boundary, the E-TFC selection entity 504 may determine a suitable E-TFC for an uplink transmission, including, for example, selecting the power to utilize on each stream (including a suitable scaling factor), selecting a transport block size (TBS) for each stream, selecting a modulation and coding scheme to utilize on each stream, and selecting a spreading factor for each stream.

Scheduling Grants

In some aspects of the disclosure, a scheduler at the Node B 208 may provide scheduling information 508 to the UE 210 for each uplink stream. This scheduling information provided to the UE 210 may be utilized to schedule resources for the UE to use in its uplink MIMO transmission. The scheduling of a UE 210 may be made in accordance with various measurements made by the Node B 208 such as the noise level at the Node B receiver, with various feedback information transmitted on the uplink by UEs such as a "happy bit," buffer status, and transmission power availability, and with priorities or other control information provided by the network. That is, when MIMO is selected, the scheduler at the Node B 208 may generate and transmit two grants, e.g., one for each stream during each TTI.

For example, the E-DCH Absolute Grant Channel (E-AGCH) is a physical channel that may be utilized to carry information from the Node B 208 to the E-TFC selection entity 504 of the UE 210 for controlling the power and transmission rate of uplink transmissions by the UE 210 on the E-DCH. Further scheduling information may also be conveyed from the Node B 208 to the E-TFC selection entity 504 of the UE 210 over the E-DCH Relative Grant Channel (E-RGCH). Here, the E-RGCH may be utilized for small adjustments during ongoing data transmissions.

The grant provided on the E-AGCH can change over time for a particular UE, so grants may be periodically or intermittently transmitted by the Node B 208. The absolute grant value carried on the E-AGCH may indicate the maximum E-DCH traffic to pilot power ratio (T/P) that the UE 210 is allowed to use in its next transmission.

The scheduling grant provided on the E-AGCH may be used by the UE 210 in UL MIMO to determine at least the TBS for the primary and secondary transport blocks to be transmitted in the next uplink transmission, as well as the transmit power on the E-DPDCH(s) and on the S-E-DPDCH(s). As described above, the TBS is the size of a block of information transmitted on a transport channel (e.g., the E-DCH) during a TTI.

The transmit power may be provided to the UE 210 in units of dB, and may be interpreted by the UE 210 as a relative power, e.g., relative to the power level of the DPCCH, referred to herein as a traffic to pilot power ratio.

E-TFC Selection, Power of Data Channels

In an aspect of the disclosure, when the rank of the transmission is Rank 2, the power of the S-E-DPDCH(s), corresponding to the secondary transport block, may be set to be equal to the power of the E-DPDCH(s), corresponding to the primary transport block. That is, the sum total power on the first stream may be equal to the sum total power on the second stream.

For example, in an aspect of the disclosure, scheduling signaling received at the UE 210 and carried by the E-AGCH may be provided to the E-TFC selection entity 504 in the form of a primary scheduling grant and a secondary scheduling grant. Here, each of the primary and the secondary scheduling grants may be provided in the form of traffic to pilot power ratios, or $(T/P)_1$ and $(T/P)_2$, respectively. Here, the E-TFC selection entity 504 may utilize the primary scheduling grant $(T/P)_1$ to determine the total amount of power to transmit on the E-DPDCH(s), relative to the current transmit power on the DPCCH. That is, the E-TFC selection entity 504 may utilize the primary scheduling grant $(T/P)_1$ to compute the power of the E-DPDCH(s), and may further set the power of the S-E-DPDCH(s) to the same value as that set for the E-DPDCH(s). In this fashion, symmetric power allocation among the primary stream on the E-DPDCH(s) and the secondary stream on the S-E-DPDCH(s) may be achieved based on the primary scheduling grant $(T/P)_1$. Importantly, in this example, the secondary scheduling grant $(T/P)_2$ is not utilized to determine the power of the secondary stream.

E-TFC Selection, TBS

In a further aspect of the present disclosure, as described above, the primary scheduling grant $(T/P)_1$ may be utilized to determine a packet size (e.g., the primary stream TBS) to be utilized on the primary stream, and the secondary scheduling grant $(T/P)_2$ may be utilized to determine a packet size (e.g., the secondary stream TBS) to be utilized on the secondary stream. Here, the determination of the corresponding packet sizes may be accomplished by the E-TFC selection entity 504, for example, by utilizing a suitable lookup table to find a corresponding transport block size and transport format combination in accordance with the signaled traffic to pilot power ratio.

E-TFC Selection, Power Scaling

In a further aspect of the disclosure, the UE 210 may have a limit on its available transmit power for uplink transmissions. That is, if the received scheduling grants configure the UE 210 to transmit below its maximum output power, the E-TFC selection algorithm may be relatively easy, such that the EUL transport format combination for each MIMO stream can simply be selected based on the serving grant for that stream. However, there is a possibility that the UE 210 is power headroom limited. That is, the power levels for uplink transmissions determined by the E-TFC selection entity 504 may configure the UE 210 to transmit at or above its maximum output power. Here, if the UE 210 is power headroom limited, then in accordance with an aspect of the present disclosure, power and rate scaling may be utilized to accommodate both of the streams.

That is, when the UE 210 is configured to select a MIMO transmission, the primary serving grant $(T/P)_1$ may be scaled by a constant, such that the UE's transmit power does not exceed the maximum transmit power. As described above, the primary serving grant $(T/P)_1$ may be utilized for selecting the power level of both the primary stream and the secondary stream; thus, scaling the primary serving grant $(T/P)_1$ in accordance with the scaling constant may accomplish power scaling of both the data channels E-DPDCH and S-E-DPDCH. In turn, the scaling of the primary serving grant $(T/P)_1$ additionally determines the power levels of the E-DPCCH and S-DPCCH, as well as the transport block size on the primary stream.

E-TFC Selection, Rate Matching and Minimum TBS for Rank 2

In a further aspect of the disclosure, one or more algorithms are provided relating to rate matching functions of the E-TFC selection procedure, in particular, for Rank 2 transmissions. Here, rate matching is used to determine a spreading factor and a modulation scheme for the uplink transmission, in accordance with a selected transport block size (TBS).

In one simple approach, a rate matching procedure for Rank 2 uplink MIMO transmissions may exactly re-use a conventional, legacy SIMO algorithm on each stream, in order to determine the spreading factor and modulation scheme as a function of the TBS on that stream. In another approach, certain algorithm parameters $PL_{nonmax}$ and/or $PL_{max}$ may be allowed to be different in each of the streams during Rank 2, and the single stream during Rank 1 transmissions.

By utilizing either of these schemes, the mapping between the TBS and the spreading factor would be different for the two streams, and would depend on the rank. Since these approaches could lead to situations where a packet retransmission is switched from the secondary to the primary stream when falling back from Rank 2 to Rank 1, the rate-matching and the spreading factor could then be different for different retransmissions of the same packet (depending on the rank used during each retransmission).

Thus, another approach according to an aspect of the present disclosure may be based on the observation that the choice of certain algorithm parameters ultimately translates to a minimum TBS that is mapped to 2×SF2+2×SF4. Thus, Rank 2 transmissions may be limited to the use a 2×SF2+2× SF4 spreading factor configuration on both primary and secondary streams. Further, this minimum TBS may be directly specified, rather than specifying the algorithm parameters, as described in the above approach. In this way, because the spreading factor is predetermined, the rate selection algorithm is needed only to determine the modulation scheme, which could be done utilizing any suitable approach. This allows more flexibility in the choice of the minimum TBS than would be allowed by other approaches. Note that, in some examples, the two spatial streams may differ in both the value of minimum TBS as well as its method of specification (explicit TBS value, or implicitly via the rate-matching algorithm as the minimum TBS mapped to 2×SF2+2×SF4).

Minimum TBS

There are certain situations where it is useful to have the requirement of a minimum TBS on each stream for rank 2 (that is, in an aspect of the disclosure, when Rank 2 is selected the TBS must be larger than a certain minimum size). For example, a very small packet on the primary stream (i.e., smaller than the minimum) will result in a small gain factor. Because this gain factor is also used on the secondary stream, this could accordingly hamper a retransmission of a large packet on the secondary stream. This situation would be prevented by the minimum TBS requirement.

Another situation involves a power-limited UE, which is scheduled with a Rank 2 transmission. In the absence of a minimum TBS requirement (or with very low minimum TBS), such a UE could end up still transmitting with Rank 2, but using a TBS and power on each stream, which is reduced to such a level as compared to the original grants that it would have been more efficient to fall back to Rank 1 instead.

In the light of the above trade-offs, an aspect of the disclosure provides a minimum TBS for Rank 2, wherein the minimum TBS may be configured by the UE 210.

Figure 6:
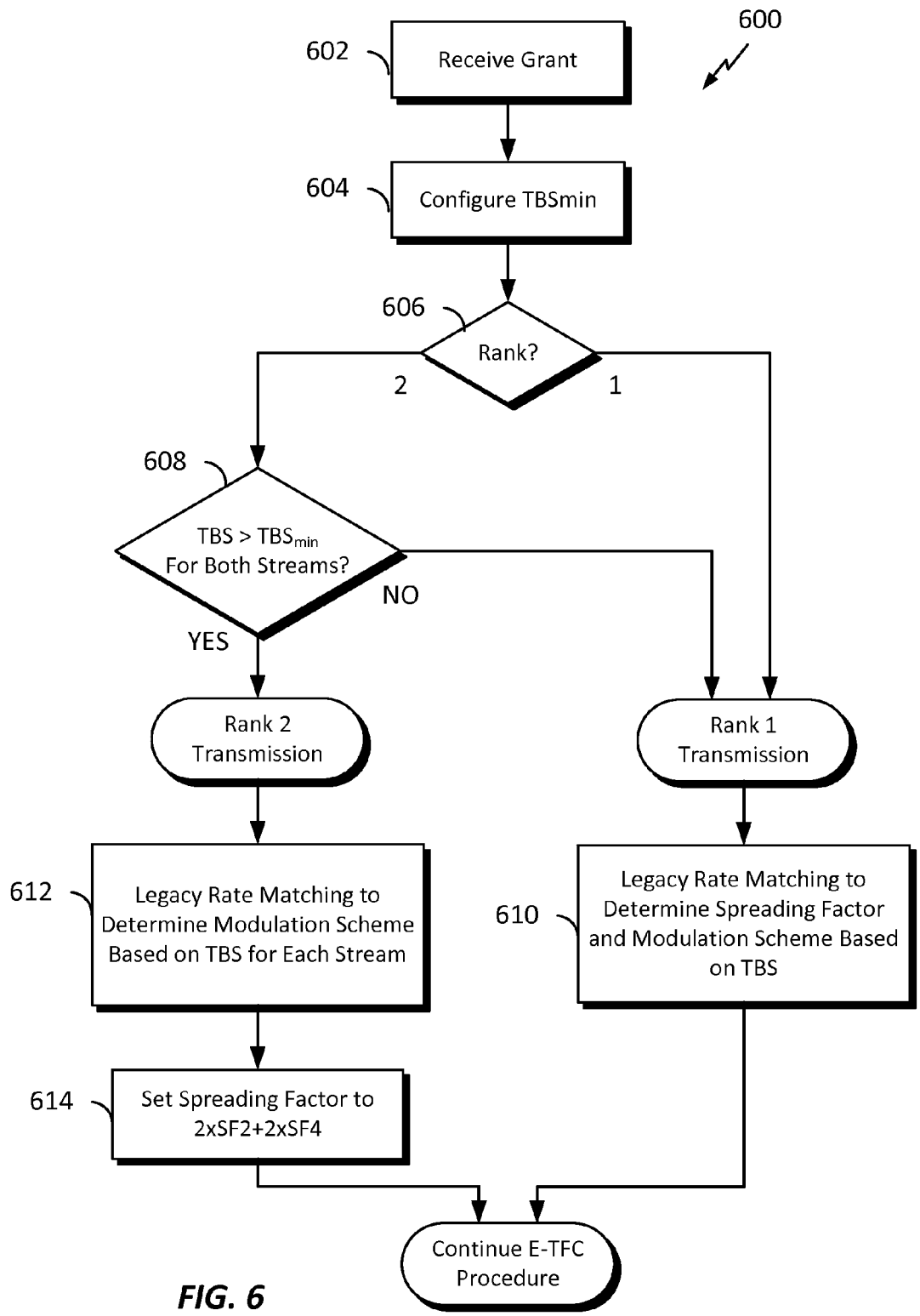
FIG. 6 is a flow chart illustrating a process of configuring an uplink MIMO transmission as a part of an E-TFC selection procedure according to one example.

FIG. 6 is a flow chart illustrating an exemplary process 600, which may be implemented as a part of an E-TFC selection procedure in accordance with one or more aspects of the disclosure. In various examples, the process 600 may be implemented by the UE 210. In another example, the process 600 may be implemented as a part of one or both HARQ processes 402 and/or 452 illustrated in FIG. 4. In another example, the process 600 may be implemented by the E-TFC selection entity 504 illustrated in FIG. 5. In another example, the process 600 may be implemented by an apparatus 900 including a processing system 914. In other examples, the process 600 may be implemented by any suitable apparatus or means for performing the below-described functions.

At step 602, the UE may receive a grant, e.g., on the E-AGCH. At step 604, the UE 210 may configure its minimum TBS ($TBS_{min}$). For example, $TBS_{min}$ may be configured at the UE 210 for each stream by upper layers (e.g., the RLC 312, RRC 316, or any other suitable layer as illustrated in FIG. 3 or above). In some examples, $TBS_{min}$ may be the same, identical value for each stream; in other examples, $TBS_{min}$ may take different values for the two streams.

At step 606, the UE 210 may determine the rank according to the received grant. For example, a rank may be determined in accordance with information received at step 602, e.g., on one or more of the E-AGCH and/or the E-ROCH.

If the rank is Rank 2, then at step 608, the UE 210 may determine whether the TBS, determined in accordance with the grant received at step 602, is greater than $TBS_{min}$. In some examples, at step 608, wherein $TBS_{min}$ may be different for each of the streams, the TBS determined for each stream may be compared to the $TBS_{min}$ corresponding to that particular stream. In other examples, wherein $TBS_{min}$ may be the same for both streams, the TBS determined for each stream may be compared to the same common $TBS_{min}$. In either case, if the TBS for both streams is greater than the corresponding $TBS_{min}$, then the process may proceed with a Rank 2 transmission; otherwise, because a TBS is below the minimum, the process may proceed with a Rank 1 transmission.

For Rank 1 transmissions, at step 610 the UE 210 may utilize any suitable rate matching algorithm, such as the existing legacy rate matching algorithms for EUL, wherein both a spreading factor and a modulation scheme are determined in accordance with the TBS.

For Rank 2 transmissions, at step 612 the UE 210 may utilize any suitable rate matching algorithm, such as the existing legacy rate matching algorithms for EUL, to determine the modulation scheme for each stream based on the TBS for that stream. However, unlike the single-stream case, here, at step 614, the UE 210 may set the spreading factor to 2×SF2+2×SF4. That is, in various examples, the spreading factor when Rank=2 may be independent of the TBS, and may be the same value for both streams.

E-TFC Selection, Non-Scheduled Grants

In addition to the scheduled grants described above, non-scheduled grants may be provided from the Node B 208 to the UE 210 for making non-scheduled transmissions, which may often carry important control information. In a multi carrier uplink (e.g., DC-HSUPA), because of their importance, non-scheduled grants are only allowed on the primary uplink frequency. For the same reason, for uplink MIMO transmissions, it makes sense for non-scheduled grants to be limited only to the primary stream. In this case, non-scheduled grants could only be made on uplink transmissions when the primary stream is not occupied by carrying retransmissions.

For a legacy (i.e., non-MIMO) uplink transmission, the UE may receive a scheduled grant, such as those provided on the E-AGCH, in terms of power. That is, as described above, the E-AGCH received at the UE indicates available power for the UE to utilize in a scheduled uplink transmission, and the UE translates this grant into a TBS utilizing a suitable E-TFC selection algorithm. On the other hand, non-scheduled grants are conveyed to the UE in terms of bits, which are generally added to this TBS selected in the E-TFC selection.

In the case that the UE is not power- or buffer-limited, the TBS corresponding to the scheduled grant (again, conveyed in terms of power, and translated into a TBS according to the E-TFC selection procedure), is added to the sum of all the non-scheduled grants. The resulting TBS is transmitted with a power corresponding to a certain gain, or beta factor. On the other hand, if the UE is power- and/or buffer-limited, the TBS used is the smallest one that allows the buffer to be emptied, if the UE has enough power to send that TBS with its associated beta factor; and the largest TBS that the UE can send with its available power otherwise. The TBS thus chosen is then populated with bits from the various MAC-d flows in order of priority, with the constraints that the number of data bits corresponding to the scheduled grant should not exceed the TBS corresponding to the received scheduled grant, and similarly, the number of data bits corresponding to the non-scheduled grant on each flow should not exceed the non-scheduled grant on that flow.

Figure 7:
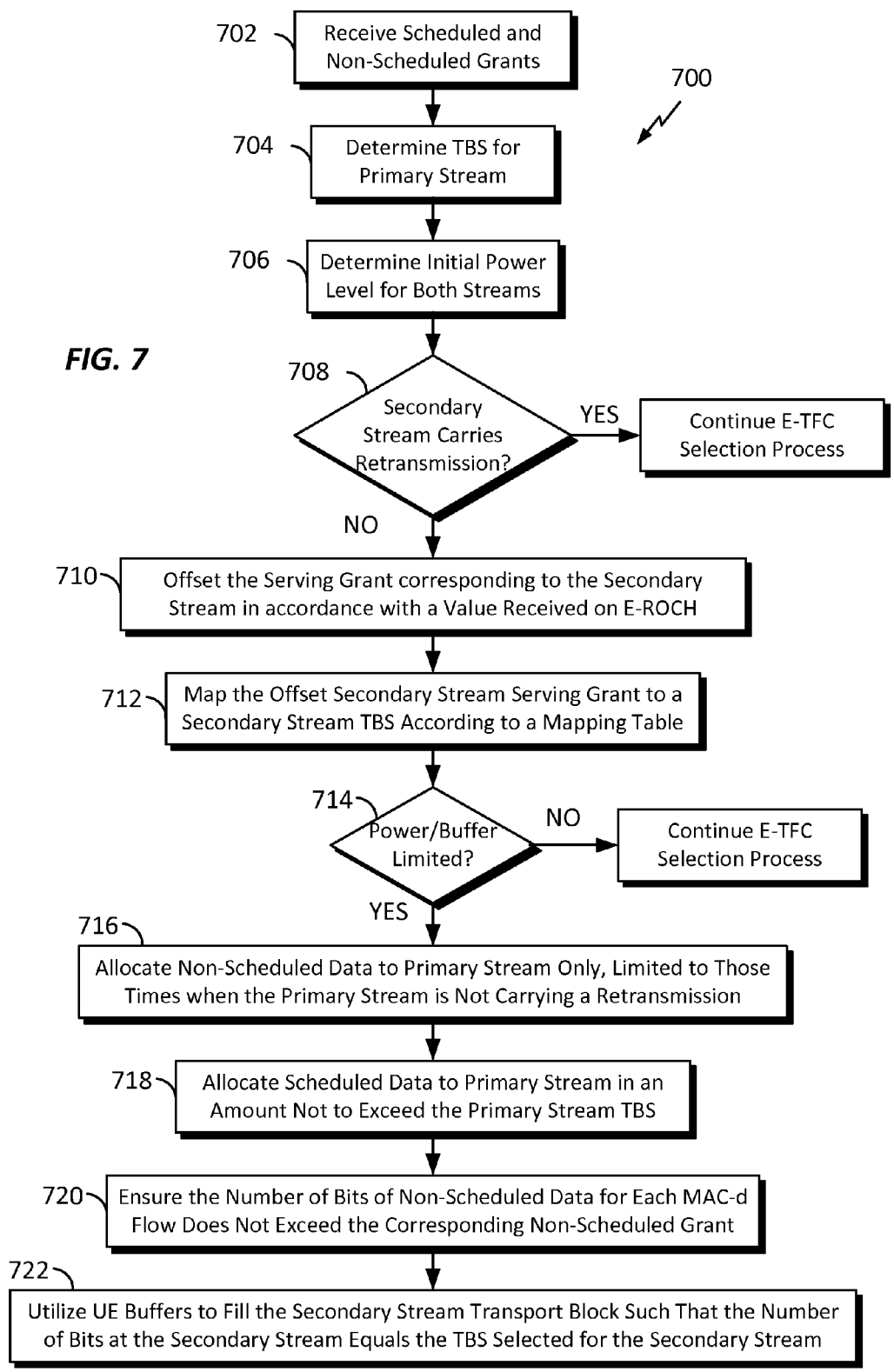
FIG. 7 is a flow chart illustrating a process of configuring an uplink MIMO transmission in the presence of non-scheduled data according to one example.

FIG. 7 is a flow chart illustrating an exemplary process 700, which may be implemented as a part of an E-TFC selection procedure in accordance with one or more aspects of the disclosure wherein Rank 2 is selected. That is, in one example, for Rank 1 MIMO transmissions the handling of non-scheduled grants may be the same as the legacy case. However, in the case of Rank 2 transmissions, the process 700 may be followed. In various examples, the process 700 may be implemented by the UE 210. In another example, the process 700 may be implemented as a part of one or both HARQ processes 402 and/or 452 illustrated in FIG. 4. In another example, the process 700 may be implemented by the E-TFC selection entity 504 illustrated in FIG. 5. In another example, the process 700 may be implemented by an apparatus 900 including a processing system 914. In other examples, the process 700 may be implemented by any suitable apparatus or means for performing the below-described functions.

At step 702, the UE 210 may receive scheduled and non-scheduled grants from the Node B 208, e.g., in the fashion described above. At step 704, in accordance with the received grants, the UE 210 may determine a value for the TBS on the primary stream, by adding together the scheduled grant and a sum of all non-scheduled grants. At step 706, the UE 210 may determine an initial power level to utilize on both streams in accordance with a certain beta gain factor associated with the TBS determined at step 704, e.g., by using a suitable lookup table that associates the TBS with the corresponding gains.

At step 708, the UE 210 may determine whether the secondary stream carries a retransmission. If the secondary stream carries a retransmission, then the UE 210 may continue a conventional E-TFC selection process. However, if the secondary stream does not carry a retransmission, then at step 710, the UE 210 may offset the serving grant corresponding to the secondary stream (e.g., in dB), in accordance with a value received on the secondary grant channel (e.g., E-ROCH). That is, in an aspect of the disclosure, the Rank and Offset Channel E-ROCH may carry, in addition to an indication of the rank to utilize on an uplink transmission, information pertaining to a certain power offset. By utilizing this power offset, an additional degree of control of the ultimate packet size (i.e., the TBS) for the secondary stream may be achieved.

Specifically, in an aspect of the disclosure, this secondary grant channel may include a plurality of index values, which may take any suitable range of values. When the UE 210 receives this information, these index values may be interpreted as corresponding to a set of E-TFC offset values. Here, these offset values may be indicated in terms of an additive or subtractive offset, or in terms of a change in gain (e.g., greater than or less than one).

As indicated above, the TBS for the secondary stream may be determined by mapping the determined power level to a corresponding TBS according to a mapping table, taking into account the offset value received on the secondary grant channel. Here, a smaller TBS may be generally desired, except in limited cases, such as in the case of retransmissions on the secondary stream, where a larger TBS is desired.

By utilizing such an offset or alteration to the initial secondary stream serving grant, the specification of all the corner cases involving power and/or buffer limitations may be unified and simplified. That is, when it is desired to scale down the primary stream gain (beta) factors utilized at step 706, the secondary stream TBS automatically reduces, since the E-ROCH offset is then applied to the new scaled-down beta-factors (as described below at step 712).

With this approach, because the offset or secondary gain is with respect to the current primary stream gain factors discussed at step 706, in order to achieve a suitable set of possible TBS values for the secondary stream the offset may be configured to have both positive and negative dB values (or, in a multiplicative example, values greater than one and values less than one). Here, if the offset value itself were to be transmitted on the E-ROCH, this would require at least one bit to indicate the sign of the offset, and thus, a change to the encoding of the secondary grant channel. While it may be possible to reuse the E-AGCH grant scope bit for this purpose on the secondary grant channel, and thus to preserve the encoding, this would conflict with other proposed uses for the grant scope bit.

If an additional bit is not used to indicate the sign of the offset, then the range of offsets must somehow be restricted. One approach would be to reduce the granularity of the offsets, but to cover both positive and negative offsets (e.g., −15 dB to +15 dB). This would provide an offset capability covering the entire range of power for UL MIMO transmissions, independent of the primary stream TBS, but with reduced granularity. However, in many cases, it may provide an unnecessarily large or small TBS. For example, if the primary stream were already using the maximum possible TBS, all positive power offsets would then be unnecessary. Thus, another alternative would be to preserve the granularity but disallow positive offsets. However, this could adversely affect the lower end of the range, as well as eliminating the ability to signal a larger TBS on the secondary stream compared to the primary stream. Although the secondary stream is usually weaker, this ability may still be desirable in case of change of channel fading during a retransmission.

Therefore, according to an aspect of the present disclosure, the granularity of the index may be preserved, and the range of offsets may be biased to have only a few positive values and many negative values.

The existing mapping between the index value received on the E-AGCH and the corresponding absolute grant values (as provided in 3GPP TS 25.212, Table 16B, or alternatively Table 16B.1, incorporated herein by reference), provides a roughly linear relationship between the index and the absolute grant, with approximately 1 dB step-size from one index value to the next.

Therefore, in an aspect of the present disclosure, the mapping table may be configured to have a granularity roughly corresponding to that of the absolute grant mapping table (e.g., about 1 dB per index value). In another aspect of the disclosure, the range of the mapping table may include a majority of entries with negative (subtractive) offsets or less-than-one gain values, configured to decrease the secondary stream TBS; and a relatively small number of entries with positive (additive) offsets or greater-than-one gain values, configured to increase the secondary stream TBS.

One simple example of such a table, in this case utilizing additive and subtractive offsets, is shown below.

TABLE 1

Mapping of E-ROCH power offset grant value

| Offset in dB | Index |
| --- | --- |
| 4 | 31 |
| 3 | 30 |
| 2 | 29 |
| 1 | 28 |
| 0 | 27 |
| −1 | 26 |
| −2 | 25 |
| −3 | 24 |
| −4 | 23 |
| −5 | 22 |
| −6 | 21 |
| −7 | 20 |
| −8 | 19 |
| −9 | 18 |
| −10 | 17 |
| −11 | 16 |
| −12 | 15 |
| −13 | 14 |
| −14 | 13 |
| −15 | 12 |

TABLE 1-continued

Mapping of E-ROCH power offset grant value

| Offset in dB | Index |
| --- | --- |
| −16 | 11 |
| −17 | 10 |
| −18 | 9 |
| −19 | 8 |
| −20 | 7 |
| −21 | 6 |
| −22 | 5 |
| −23 | 4 |
| −24 | 3 |
| −25 | 2 |
| ZERO_GRANT* | 1 |
| INACTIVE* | 0 |

Table 1 shows a simple example of a lookup table that may be stored at the UE 210. In this example, the Index column includes 32 values, from 0 to 31. Here, the Index value may correspond to an information element received by the UE 210 on the secondary grant channel (e.g., the E-ROCH). The Offset column illustrates the offset to utilize at step 710, which corresponds to the Index value received.

In the illustrated table, the form of the offset is in dB. That is, in some aspects of the disclosure, the offset may be an additive/subtractive offset, wherein, at step 710, the offset looked up in the table corresponding to the received index value is added to the initial serving grant for the secondary stream. This is merely one example, however, and in another example, the offset may be a multiplicative offset, wherein, at step 710, the "offset" may in fact be a gain value, which may be greater than, less than, or equal to one. In this example, rather than adding the offset value in the table to the serving grant determined for the secondary stream, the gain value in the table may be multiplied with the initial serving grant for the secondary stream. Thus, in the present disclosure, the term "offset" utilized in this context may refer to any modification to an initial serving grant for a secondary stream determined as described above.

In the illustrated example, the range of values for the offset ranges from +4 dB to −25 dB, with two of the values being utilized to indicate a zero grant (index 1) or inactivity (index 0). That is, the range in the illustrated example provides a majority of values configured to reduce the serving grant relative to the initial serving grant for the secondary stream. Further, the range in the illustrated example provides a minority of values configured to increase the power level relative to the initial serving grant for the secondary stream.

In this way, the offset for the secondary stream TBS may be determined independent of the primary stream TBS (or the primary serving grant).

Returning to FIG. 7, at step 712, the secondary stream serving grant, including the offset determined at step 710, may be mapped to a revised TBS for the secondary stream in accordance with a suitable mapping table. As described above, by mapping the offset serving grant to the secondary stream TBS, the secondary stream TBS may have at least a degree of independence from the primary stream TBS.

At step 714, the UE 210 may determine whether allocation of data for the UL MIMO transmission is limited by the available transmit power, or by the amount of data in the buffers. That is, as indicated above, the E-TFC selection process may be carried out to select the E-TFC to utilize for each uplink stream. When deciding whether an E-TFC is suitable, it may be the case that there is insufficient power available to the UE 210 for a particular transport format. That is, the maximum TBS (e.g., in a number of bits) that the UE can support for a stream, based on available power, is less than a number of bits allowed for that stream in scheduled and non-scheduled grants, and/or is less than a number of bits of data in a buffer ready for transmission. In this case, it may be said that the E-TFC selection process for the UE 210 is power-limited.

Furthermore, it may be the case that the number of data bits in a buffer ready for transmission is less than the number of bits that the power available for transmission could support, and/or is less than a number of bits allowed for that stream in scheduled and non-scheduled grants. In this case it may be said that the E-TFC selection process for the UE 210 is buffer-limited (or data-limited). Together, it may be said that the E-TFC selection process for the UE 210 is power- or buffer-limited.

If, at step 714 the UE 210 determines that it is not power- or buffer-limited, then the process may continue a conventional E-TFC selection process. However, in the case of power and/or buffer limitations, the E-TFC selection rules are applied just as in the case when there are no non-scheduled grants, and the scheduled grants correspond to the TBS on the two streams that are selected as above. That is, the UE data buffers are used first to fill the primary stream transport block, and then the secondary stream transport block, with certain constraints on the filling of the primary stream transport block. For example, non-scheduled data bits can only be carried on the primary stream. Thus, at step 716, the UE 210 may allocate non-scheduled data to the primary stream only. Here, the allocation of non-scheduled data to the primary stream may be limited to times when the primary stream is not carrying a retransmission; otherwise, the non-scheduled data may be delayed until the following TTI.

At step 718, the UE may allocate scheduled data to the primary stream in an amount that does not exceed the TBS corresponding to the primary stream's serving grant. Still further, at step 720, the UE 210 may ensure that the number of bits of non-scheduled data for each MAC-d flow does not exceed the corresponding non-scheduled grant. Here, there is no additional constraint on the number of bits on the secondary stream, and thus, at step 722, the UE 210 may utilize the UE buffers to fill the secondary stream transport block such that this number may accordingly equal the TBS selected on this stream based on the above rules.

Power Limitation Contingency: Fall-Back to Rank 1

In a further aspect of the disclosure, the UE may be enabled to fall back from a Rank 2 transmission to a Rank 1 transmission in the presence of non-scheduled flows in the case that the UE 210 is power-limited.

Figure 8:
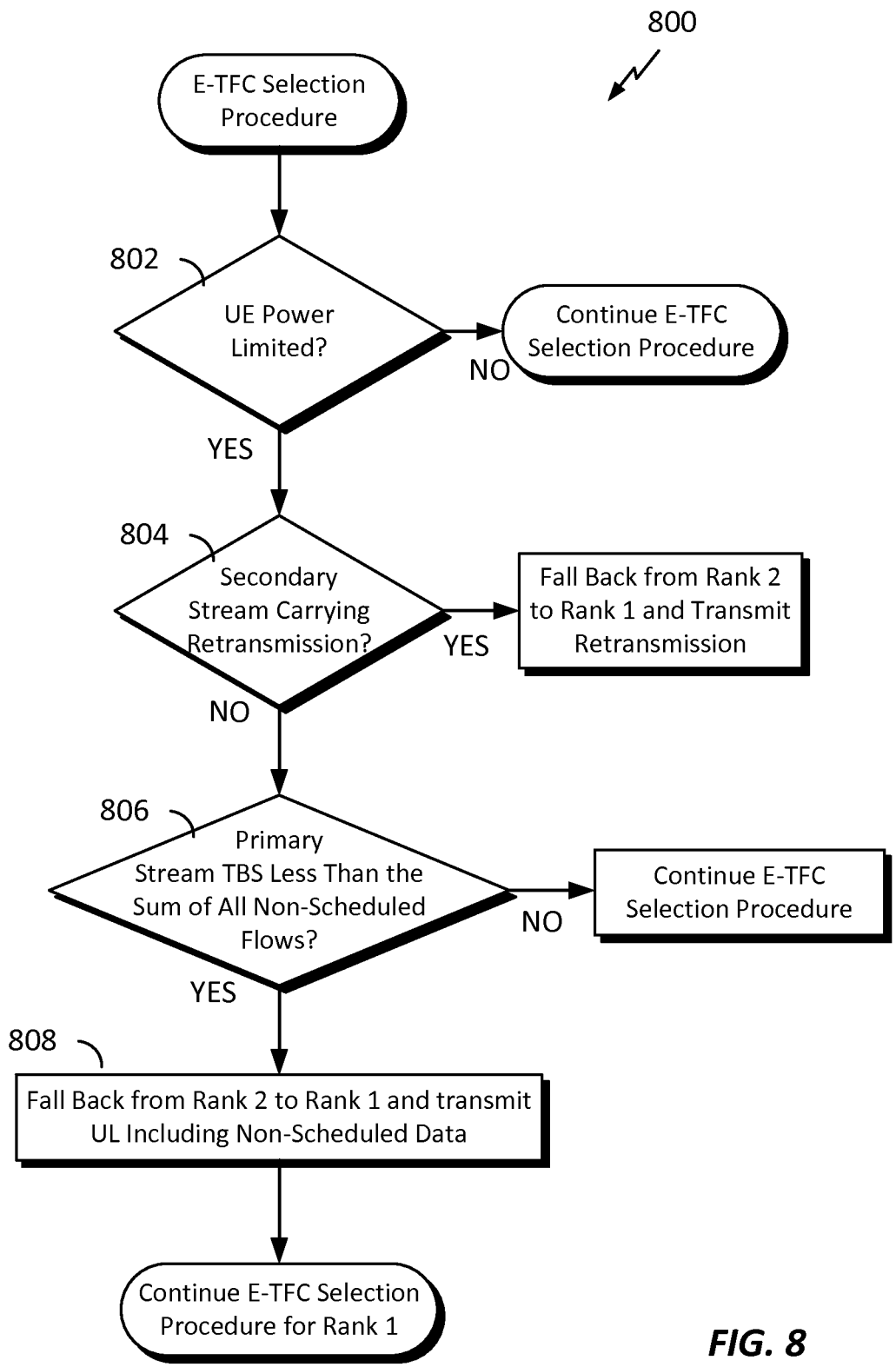
FIG. 8 is a flow chart illustrating a process of falling back from a Rank 2 uplink MIMO transmission to a Rank 1 transmission according to one example.

FIG. 8 is a flow chart illustrating an exemplary process 800, which may be implemented as a part of an E-TFC selection procedure in accordance with one or more aspects of the disclosure wherein a UE is configured for a Rank 2 transmission in the presence of non-scheduled data. In various examples, the process 800 may be implemented by the UE 210. In another example, the process 800 may be implemented as a part of one or both HARQ processes 402 and/or 452 illustrated in FIG. 4. In another example, the process 800 may be implemented by the E-TFC selection entity 504 illustrated in FIG. 5. In another example, the process 800 may be implemented by an apparatus 900 including a processing system 914. In other examples, the process 800 may be implemented by any suitable apparatus or means for performing the below-described functions.

When the UE 210 is power-limited, it may not be capable of utilizing the selected packet size (TBS), and accordingly the TBS on both streams may be reduced. However, as indicated above, non-scheduled data is constrained only to be carried on the primary stream. If this TBS reduction is to such an extent that it hinders the transmission of the non-scheduled data, this can present a problem, since these non-scheduled flows may carry information having a high priority. Therefore, in certain circumstances, the UE 210 may be enabled to fall back to rank 1, transmitting a single-stream uplink. For example, in the case that the UE 210 is power-limited, and the secondary stream is not carrying a retransmission, the UE 210 may fall back from a rank 2 transmission to a rank 1 transmission if the primary stream's TBS is less than the sum of all the non-scheduled flows. When the UE is power-limited, such a fall-back can increase the number of bits from these non-scheduled flows that can be transmitted.

Referring now to FIG. 8, at step 802, the UE 210 may determine whether the UL MIMO transmission is power-limited, as described above. If yes, then at step 804, the UE 210 may determine whether the secondary stream is carrying a packet retransmission (e.g., a HARQ retransmission). If the secondary stream is carrying a retransmission, then the process may fall back from Rank 2 to Rank 1, and re-transmit the data from the primary stream in Rank 1. If the secondary stream is not carrying a retransmission, then at step 806 the UE 210 may determine whether the primary stream's TBS is less than the sum of all the non-scheduled flows. That is, the UE 210 may determine, for each non-scheduled flow, which is less: the non-scheduled grant for that flow, or the current buffer level of that flow. This determination may be expressed as follows:

$$\min(B_i, NSG_i)$$

where $B_i$ is the buffer level, and $NSG_i$ is the non-scheduled grant for the i-th flow.

Once this is determined for each non-scheduled flow, the UE 210 may then add up these minimums across all non-scheduled flows, and at step 808, if the primary stream TBS chosen with Rank 2 is less than this sum the UE 210 may fall back to Rank 1, and accordingly perform an E-TFC selection procedure for Rank 1 transmission. Upon selecting an E-TFC for Rank 1, the UE 210 may transmit the uplink including the non-scheduled data as a Rank 1 transmission.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 9 is a conceptual diagram illustrating an example of a hardware implementation for an apparatus 900 employing a processing system 914. In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors, represented generally by the processor 904, a memory 905, and computer-readable media, represented generally by the computer-readable medium 906. The bus 902 may also link various other circuits such as timing sources, peripherals, voltage regulators, and power management circuits, which are well known in the art, and therefore, will not be described any further. A bus interface 108 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described infra for any particular apparatus. The computer-readable medium 906 may also be used for storing data that is manipulated by the processor 104 when executing software.

In various examples within the scope of the present disclosure, the processing system 914 may reside within, and/or include, the UE 210 or 1050 (described below). Furthermore, the processing system 914 be configured to perform or employ one or more of the methods, features, parameters, and/or steps described in FIGS. 6, 7, and/or 8. The novel algorithms described herein may also be efficiently implemented in software and/or embedded in hardware.

Figure 10:
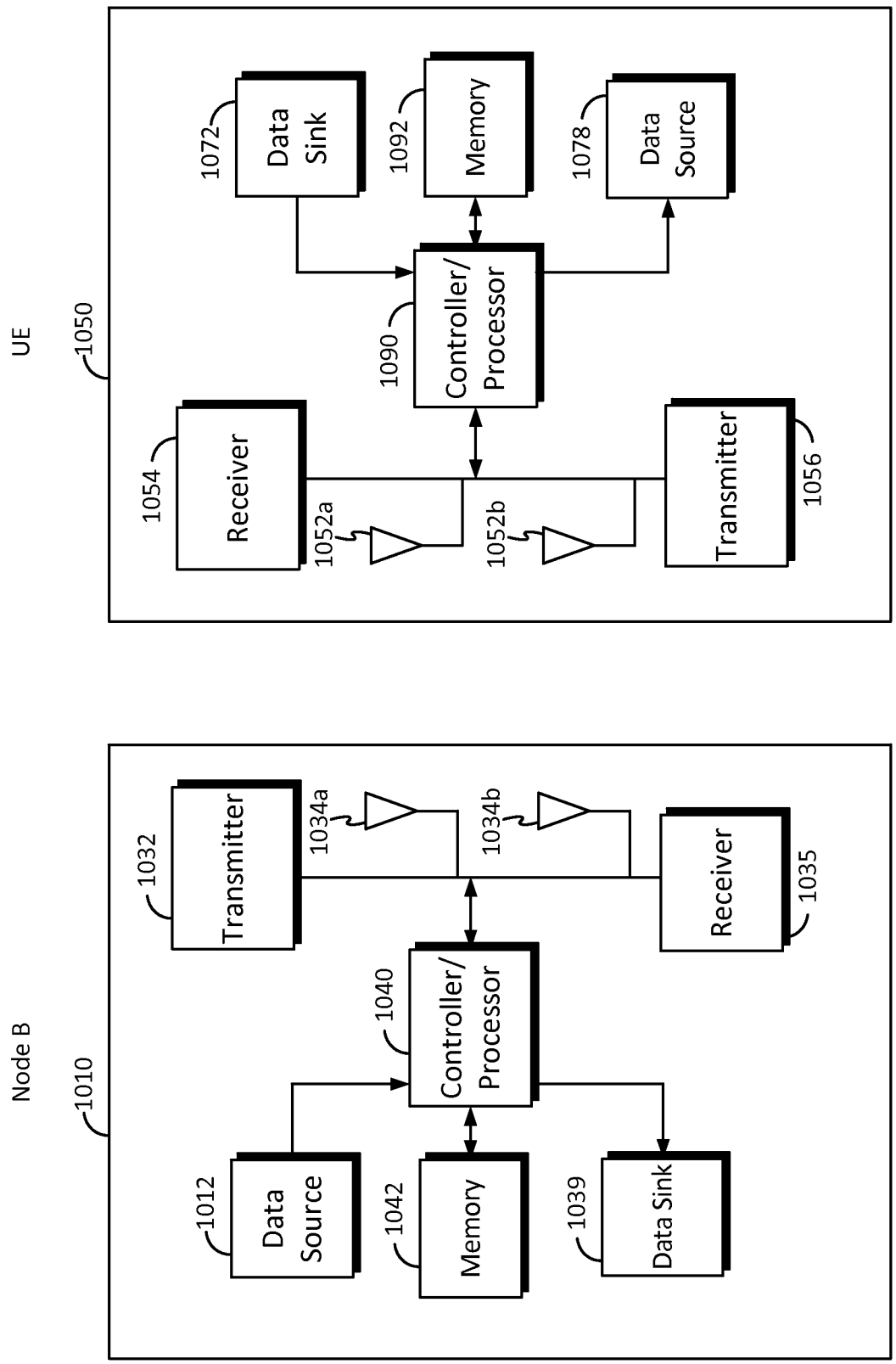
FIG. 10 is a block diagram conceptually illustrating an example of a Node B in communication with a UE in a telecommunications system.

FIG. 10 is a block diagram of an exemplary Node B 1010 in communication with an exemplary UE 1050, where the Node B 1010 may be the Node B 208 in FIG. 2, and the UE 1050 may be the UE 210 in FIG. 2. In the downlink communication, a controller or processor 1040 may receive data from a data source 1012. Channel estimates may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. A transmitter 1032 may provide various signal conditioning functions including amplifying, filtering, and modulating frames onto a carrier for downlink transmission over a wireless medium through one or more antennas 1034. The antennas 1034 may include one or more antennas, for example, including beam steering bidirectional adaptive antenna arrays, MIMO arrays, or any other suitable transmission/reception technologies.

At the UE 1050, a receiver 1054 receives the downlink transmission through one or more antennas 1052 and processes the transmission to recover the information modulated onto the carrier. The information recovered by the receiver 1054 is provided to a controller/processor 1090. The processor 1090 descrambles and despreads the symbols, and determines the most likely signal constellation points transmitted by the Node B 1010 based on the modulation scheme. These soft decisions may be based on channel estimates computed by the processor 1090. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided. The data source 1078 may represent applications running in the UE 1050 and various user interfaces (e.g., keyboard). Similar to the functionality described in connection with the downlink transmission by the Node B 1010, the processor 1090 provides various signal processing functions including CRC codes, coding and interleaving to facilitate FEC, mapping to signal constellations, spreading with OVSFs, and scrambling to produce a series of symbols. Channel estimates, derived by the processor 1090 from a reference signal transmitted by the Node B 1010 or from feedback contained in a midamble transmitted by the Node B 1010, may be used to select the appropriate coding, modulation, spreading, and/or scrambling schemes. The symbols produced by the processor 1090 will be utilized to create a frame structure. The processor 1090 creates this frame structure by multiplexing the symbols with additional information, resulting in a series of frames. The frames are then provided to a transmitter 1056, which provides various signal conditioning functions including amplification, filtering, and modulating the frames onto a carrier for uplink transmission over the wireless medium through the one or more antennas 1052.

The uplink transmission is processed at the Node B 1010 in a manner similar to that described in connection with the receiver function at the UE 1050. A receiver 1035 receives the uplink transmission through the one or more antennas 1034 and processes the transmission to recover the information modulated onto the carrier. The information recovered by the receiver 1035 is provided to the processor 1040, which parses each frame. The processor 1040 performs the inverse of the processing performed by the processor 1090 in the UE 1050. The data and control signals carried by the successfully decoded frames may then be provided to a data sink 1039. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of configuring an uplink multiple-input multiple-output (MIMO) transmission at a wireless user equipment (UE), comprising:
   receiving an absolute grant for the uplink MIMO transmission, comprising a first grant for scheduled data and at least one second grant for non-scheduled data;
   determining a primary stream transport block size (TBS) and a secondary stream TBS;
   determining a power level for both a primary stream and a secondary stream;
   allocating the non-scheduled data only to the primary stream;
   if the allocated non-scheduled data is less than the determined primary stream TBS, allocating the scheduled data to the primary stream in an amount not to exceed the determined primary stream TBS; and
   allocating the scheduled data to the secondary stream in an amount not to exceed the determined secondary stream TBS,
   wherein the determining of the secondary stream TBS comprises:
      determining an initial secondary stream TBS corresponding to a received serving grant;
      determining an offset power level for the secondary stream corresponding at least in part to information received on a secondary grant channel; and
      mapping the offset power level to the secondary stream TBS in accordance with information stored in a memory at the UE.

2. The method of claim 1, wherein the allocating the non-scheduled data only to the primary stream comprises allocating the non-scheduled data only to the primary stream only if the primary stream is not carrying a packet retransmission.

3. The method of claim 1, wherein the determining of the primary stream TBS comprises:
   determining a sum of the first grant for scheduled data and all grants of the at least one second grant for non-scheduled data.

4. The method of claim 1, wherein the determining the offset power level for the secondary stream comprises:
   determining an offset value in accordance with the information received on the secondary grant channel, wherein the information received on the secondary grant channel comprises an index value,
   wherein the determining the offset value comprises utilizing a mapping table stored in a memory at the UE, and
   wherein the mapping table comprises a range of offset values having a majority of offset values configured to decrease the secondary stream TBS, and a minority of offset values configured to increase the secondary stream TBS.

5. The method of claim 4, wherein the offset values comprise additive and subtractive offsets, such that the determining the offset power level for the secondary stream comprises adding the determined offset value to an initial power level for the secondary stream.

6. The method of claim 4, wherein the offset values comprise multiplicative offsets, such that the determining the offset power level for the secondary stream comprises multiplying the determined offset value with an initial power level for the secondary stream.

7. A method of configuring an uplink multiple-input multiple-output (MIMO) transmission at a wireless user equipment (UE), comprising:
   receiving an absolute grant for the uplink MIMO transmission, comprising a first grant for scheduled data and at least one second grant for non-scheduled data;
   determining a primary stream transport block size (TBS) and a secondary stream TBS;
   determining a power level for both a primary stream and a secondary stream;
   allocating the non-scheduled data only to the primary stream;
   if the allocated non-scheduled data is less than the determined primary stream TBS, allocating the scheduled data to the primary stream in an amount not to exceed the determined primary stream TBS;

allocating the scheduled data to the secondary stream in an amount not to exceed the determined secondary stream TBS;

determining that an enhanced uplink (EUL) dedicated channel (E-DCH) transport format combination (E-TFC) selection process for the UE is power-limited;

determining that the secondary stream is not carrying a packet retransmission;

determining that the primary stream TBS is less than the sum of all non-scheduled flows; and falling back from a rank 2 transmission to a rank 1 transmission.

8. The method of claim 7, wherein the determining that the primary stream TBS is less than the sum of all non-scheduled flows comprises:

determining, for each non-scheduled flow, which is less: the grant of the at least one second grant for non-scheduled data corresponding to the non-scheduled flow, or a current buffer level corresponding to the non-scheduled flow;

adding together the determined lesser value across all of the non-scheduled flows; and determining whether the determined primary stream TBS is less than the added together values.

9. A wireless user equipment (UE) configured for uplink multiple-input multiple-output (MIMO) transmission, comprising:

means for receiving an absolute grant for the uplink MIMO transmission, comprising a first grant for scheduled data and at least one second grant for non-scheduled data;

means for determining a primary stream transport block size (TBS) and a secondary stream TBS;

means for determining a power level for both a primary stream and a secondary stream; and means for allocating, configured to:
  allocate the non-scheduled data only to the primary stream;
  if the allocated non-scheduled data is less than the determined primary stream TBS, allocate the scheduled data to the primary stream in an amount not to exceed the determined primary stream TBS; and
  allocate the scheduled data to the secondary stream in an amount not to exceed the determined secondary stream TBS, wherein the determining of the secondary stream TBS comprises:
  determining an initial secondary stream TBS corresponding to a received serving grant;
  determining an offset power level for the secondary stream corresponding at least in part to information received on a secondary grant channel; and
  mapping the offset power level to the secondary stream TBS in accordance with information stored in a memory at the UE.

10. The wireless user equipment of claim 9, wherein the allocating the non-scheduled data only to the primary stream comprises allocating the non-scheduled data only to the primary stream only if the primary stream is not carrying a packet retransmission.

11. The wireless user equipment of claim 9, wherein the determining the primary stream TBS comprises:

determining a sum of the first grant for scheduled data and all grants of the at least one second grant for non-scheduled data.

12. The wireless user equipment of claim 9, wherein the determining the offset power level for the secondary stream comprises:

determining an offset value in accordance with the information received on the secondary grant channel, wherein the information received on the secondary grant channel comprises an index value, wherein the determining the offset value comprises utilizing a mapping table stored in a memory at the UE, and wherein the mapping table comprises a range of offset values having a majority of offset values configured to decrease the secondary stream TBS, and a minority of offset values configured to increase the secondary stream TBS.

13. The wireless user equipment of claim 12, wherein the offset values comprise additive and subtractive offsets, such that the determining the offset power level for the secondary stream comprises adding the determined offset value to an initial power level for the secondary stream.

14. The wireless user equipment of claim 12, wherein the offset values comprise multiplicative offsets, such that the determining the offset power level for the secondary stream comprises multiplying the determined offset value with an initial power level for the secondary stream.

15. A wireless user equipment (UE) configured for uplink multiple-input multiple-output (MIMO) transmission, comprising:

means for receiving an absolute grant for the uplink MIMO transmission, comprising a first grant for scheduled data and at least one second grant for non-scheduled data;

means for determining a primary stream transport block size (TBS) and a secondary stream TBS;

means for determining a power level for both a primary stream and a secondary stream;

means for allocating, configured to:
  allocate the non-schedule data only to the primary stream;
  if the allocated non-scheduled data is less than the determined primary stream TBS, allocate the scheduled data to the primary stream in an amount not to exceed the determined primary stream TBS; and
  allocate the schedule data to the secondary stream in an amount not to exceed the determined secondary stream TBS;

means for determining that an enhanced uplink (EUL) dedicated channel (E-DCH) transport formal combination (E-TFC) selection process for the UE is power-limited;

means for determining that the secondary stream is not carrying a packet retransmission;

means for determining that the primary stream TBS is less than the sum of all non-scheduled flows; and means for falling back from a rank 2 transmission to a rank 1 transmission.

16. The wireless user equipment of claim 15, wherein the means for determining that the primary stream TBS is less than the sum of all non-scheduled flows comprises:

means for determining, for each non-scheduled flow, which is less: the grant of the at least one second grant for non-scheduled data corresponding to the non-scheduled flow, or a current buffer level corresponding to the non-scheduled flow;

means for adding together the determined lesser value across all of the non-scheduled flows; and means for determining whether the determined primary stream TBS is less than the added together values.

17. A wireless user equipment (UE) configured for uplink multiple-input multiple-output (MIMO) transmission, comprising:
- at least one processor;
- a memory coupled to the at least one processor; and
- a wireless communication interface coupled to the at least one processor,
- wherein the at least one processor is configured to:
  - receive an absolute grant for the uplink MIMO transmission, comprising a first grant for scheduled data and at least one second grant for non-scheduled data;
  - determine a primary stream transport block size (TBS) and a secondary stream TBS;
  - determine a power level for both a primary stream and a secondary stream;
  - allocate the non-scheduled data only to the primary stream;
  - if the allocated non-scheduled data is less than the determined primary stream TBS, allocate the scheduled data to the primary stream in an amount not to exceed the determined primary stream TBS; and
  - allocate the scheduled data to the secondary stream in an amount not to exceed the determined secondary stream TBS,
  - wherein the at least one processor, being configured to determine the secondary stream TBS, is further configured to:
    - determine an initial secondary stream TBS corresponding to a received serving grant;
    - determine an offset power level for the secondary stream corresponding at least in part to information received on a secondary grant channel; and
    - map the offset power level to the secondary stream TBS in accordance with information stored in a memory at the UE.

18. The wireless user equipment of claim 17, wherein the at least one processor, being configured to allocate the non-scheduled data only to the primary stream, is further configured to allocate the non-scheduled data only to the primary stream only if the primary stream is not carrying a packet retransmission.

19. The wireless user equipment of claim 17, wherein the at least one processor, being configured to determine the primary stream TBS, is further configured to determine a sum of the first grant for scheduled data and all grants of the at least one second grant for non-scheduled data.

20. The wireless user equipment of claim 17, wherein the at least one processor, being configured to determine the offset power level for the secondary stream, is further configured to:
- determine an offset value in accordance with the information received on the secondary grant channel, wherein the information received on the secondary grant channel comprises an index value,
- wherein the at least one processor, being configured to determine the offset value, is further configured to utilize a mapping table stored in a memory at the UE, and
- wherein the mapping table comprises a range of offset values having a majority of offset values configured to decrease the secondary stream TBS, and a minority of offset values configured to increase the secondary stream TBS.

21. The wireless user equipment of claim 20, wherein the offset values comprise additive and subtractive offsets, such that the at least one processor, being configured to determine the offset power level for the secondary stream, is further configured to add the determined offset value to an initial power level for the secondary stream.

22. The wireless user equipment of claim 20, wherein the offset values comprise multiplicative offsets, such that the at least one processor, being configured to determine the offset power level for the secondary stream, is further configured to multiply the determined offset value with an initial power level for the secondary stream.

23. A wireless user equipment (UE) configured for uplink multiple-input multiple-output (MIMO) transmission, comprising:
- at least one processor;
- a memory coupled to the at least one processor; and
- a wireless communication interface coupled to the at least one processor,
- wherein the at least one processor is configured to:
  - receive an absolute grant for the uplink MIMO transmission, comprising a first grant for scheduled data and at least one second grant for non-scheduled data;
  - determine a primary stream transport block size (TBS) and a secondary stream TBS;
  - determine a power level for both the primary stream and a secondary stream;
  - allocate the non-scheduled data only to the primary stream;
  - if the allocated non-scheduled data is less than the determined primary stream TBS, allocate the scheduled data to the primary stream in an amount not to exceed the determined primary stream TBS;
  - allocate the scheduled data to the secondary stream in an amount not to exceed the determined secondary stream TBS;
  - determine that an enhanced uplink (EUL) dedicated channel (E-DCH) transport format combination (E-TFC) selection process for the UE is power-limited;
  - determine that the secondary stream is not carrying a packet retransmission;
  - determine that the primary stream TBS is less than the sum of all non-scheduled flows; and
  - fall back from a rank 2 transmission to a rank 1 transmission.

24. The wireless user equipment of claim 23, wherein the at least one processor, being configured to determine that the primary stream TBS is less than the sum of all non-scheduled flows, is further configured to:
- determine, for each non-scheduled flow, which is less: the grant of the at least one second grant for non-scheduled data corresponding to the non-scheduled flow, or a current buffer level corresponding to the non-scheduled flow;
- add together the determined lesser value across all of the non-scheduled flows; and
- determine whether the determined primary stream TBS is less than the added together values.

25. A non-transitory computer-readable medium operable at a wireless user equipment (UE) configured for uplink multiple-input multiple-output (MIMO) transmission, comprising:
- instructions for causing a computer to receive an absolute grant for the uplink MIMO transmission, comprising a first grant for scheduled data and at least one second grant for non-scheduled data;
- instructions for causing a computer to determine a primary stream transport block size (TBS) and a secondary stream TBS;
- instructions for causing a computer to determine a power level for both a primary stream and a secondary stream;

instructions for causing a computer to allocate the non-scheduled data only to the primary stream;
instructions for causing a computer to, if the allocated non-scheduled data is less than the determined primary stream TBS, allocate the scheduled data to the primary stream in an amount not to exceed the determined primary stream TBS; and
instructions for causing a computer to allocate the scheduled data to the secondary stream in an amount not to exceed the determined secondary stream TBS,
wherein the determining of the secondary stream TBS comprises:
determining an initial secondary stream TBS corresponding to a received serving grant;
determining an offset power level for the secondary stream corresponding at least in part to information received on a secondary grant channel; and
mapping the offset power level to the secondary stream TBS in accordance with information stored in a memory at the UE.

26. The non-transitory computer-readable medium of claim 25, wherein the instructions for causing a computer to allocate the non-scheduled data only to the primary stream, are further configured to allocate the non-scheduled data only to the primary stream only if the primary stream is not carrying a packet retransmission.

27. The non-transitory computer-readable medium of claim 25, wherein the instructions for causing a computer to determine the primary stream TBS, are further configured to determine a sum of the first grant for scheduled data and all grants of the at least one second grant for non-scheduled data.

28. The non-transitory computer-readable medium of claim 25, wherein the instructions for causing a computer to determine the offset power level for the secondary stream, are further configured to:
determine an offset value in accordance with the information received on the secondary grant channel, wherein the information received on the secondary grant channel comprises an index value,
wherein the instructions for causing a computer to determine the offset value, are further configured to utilize a mapping table stored in a memory at the UE, and
wherein the mapping table comprises a range of offset values having a majority of offset values configured to decrease the secondary stream TBS, and a minority of offset values configured to increase the secondary stream TBS.

29. The non-transitory computer-readable medium of claim 28, wherein the offset values comprise additive and subtractive offsets, such that the instructions for causing a computer to determine the offset power level for the secondary stream are further configured to add the determined offset value to an initial power level for the secondary stream.

30. The non-transitory computer-readable medium of claim 28, wherein the offset values comprise multiplicative offsets, such that the instructions for causing a computer to determine the offset power level for the secondary stream, are further configured to multiply the determined offset value with an initial power level for the secondary stream.

31. A non-transitory computer-readable medium operable at a wireless user equipment (UE) configured for uplink multiple-input multiple-output (MIMO) transmission, comprising:
instructions for causing a computer to receive an absolute grant for the uplink MIMO transmission, comprising a first grant for scheduled data and at least one second grant for non-scheduled data;
instructions for causing a computer to determine a primary stream transport block size (TBS) and a secondary stream TBS;
instructions for causing a computer to determine a power level for both a primary stream and a secondary stream;
instructions for causing a computer to allocate the non-scheduled data only to the primary stream:
instructions for causing a computer to, if the allocated non-scheduled data is less than the determined primary stream TBS, allocate the scheduled data to the primary stream in an amount not to exceed the determined primary stream TBS;
instructions for causing a computer to allocate the scheduled data to the secondary stream in an amount not to exceed the determined secondary stream TBS;
instructions for causing a computer to determine that an enhanced uplink (EUL) dedicated channel (E-DCH) transport format combination (E-TFC) selection process for the UE is power-limited;
instructions for causing a computer to determine that the secondary stream is not carrying a packet retransmission;
instructions for causing a computer to determine that the primary stream TBS is less than the sum of all non-scheduled flows; and
instructions for causing a computer to fall back from a rank 2 transmission to a rank 1 transmission.

32. The non-transitory computer-readable medium of claim 31, wherein the instructions for causing a computer to determine that the primary stream TBS is less than the sum of all non-scheduled flows, are further configured to:
determine, for each non-scheduled flow, which is less: the grant of the at least one second grant for non-scheduled data corresponding to the non-scheduled flow, or a current buffer level corresponding to the non-scheduled flow;
add together the determined lesser value across all of the non-scheduled flows; and
determine whether the determined primary stream TBS is less than the added together values.

* * * * *